(12) United States Patent
Miyano

(10) Patent No.: US 7,907,352 B2
(45) Date of Patent: Mar. 15, 2011

(54) ENDOSCOPE OBJECTIVE LENS AND ENDOSCOPE

(75) Inventor: Hitoshi Miyano, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 408 days.

(21) Appl. No.: 12/099,574

(22) Filed: Apr. 8, 2008

(65) Prior Publication Data

US 2008/0249367 A1 Oct. 9, 2008

(30) Foreign Application Priority Data

Apr. 9, 2007 (JP) ................. P2007-101588
Apr. 9, 2007 (JP) ................. P2007-101589

(51) Int. Cl.
*G02B 9/00* (2006.01)
(52) U.S. Cl. ................. 359/754; 359/761
(58) Field of Classification Search .......... 359/754, 359/749, 753, 762, 751–752
See application file for complete search history.

(56) References Cited

U.S. PATENT DOCUMENTS

| 5,777,797 A | 7/1998 | Miyano |
| 5,936,778 A | 8/1999 | Miyano et al. |
| 2004/0125469 A1* | 7/2004 | Miyano ............ 359/783 |

FOREIGN PATENT DOCUMENTS

| JP | 63-261213 A | 10/1988 |
| JP | 2004-205779 A | 7/2004 |

* cited by examiner

*Primary Examiner* — Joseph Martinez
*Assistant Examiner* — James R Greece
(74) *Attorney, Agent, or Firm* — Birch, Stewart, Kolasch & Birch, LLP

(57) ABSTRACT

An endoscope objective lens includes, in order from an object side, a negative first lens, a first cemented lens, an aperture diaphragm, a positive fourth lens and a second cemented lens. The negative first lens has a concave surface directed to an image side. The first cemented lens is formed by cementing a second lens and a third lens. One of the second and third lenses is positive and. The other is negative. The positive fourth lens includes a flat surface or a surface having a larger absolute value in radius of curvature, directed to the object side. The second cemented lens is formed by cementing a positive fifth lens and a negative sixth lens in order from the object side. The second cemented lens has a positive refractive power as a whole. The endoscope objective lens satisfies the following conditional expressions (1) and (2).

$$\frac{f^2 \times |v_5 - v_6|}{|R_A| \times (Bf + d_6/n_6)} > 10 \quad (1)$$

$$Bf/f > 2.5 \quad (2)$$

19 Claims, 18 Drawing Sheets

EXAMPLE 1

EXAMPLE 2

EXAMPLE 3

EXAMPLE 4

EXAMPLE 5

EXAMPLE 6

EXAMPLE 1

EXAMPLE 2

EXAMPLE 3

EXAMPLE 4

EXAMPLE 5

EXAMPLE 6

EXAMPLE 7

EXAMPLE 8

EXAMPLE 9

EXAMPLE 10

EXAMPLE 11

EXAMPLE 8

EXAMPLE 9

EXAMPLE 10

EXAMPLE 11

ENDOSCOPE OBJECTIVE LENS AND ENDOSCOPE

CROSS-REFERENCE TO RELATED APPLICATIONS

This application is based upon and claims the benefit of priority from the Japanese Patent Application Nos. 2007-101588 and 2007-101589 both filed on Apr. 9, 2007; the entire contents of which are incorporated herein by reference.

BACKGROUND OF THE INVENTION

1. Technical Field

The invention relates to an endoscope objective lens and an endoscope, and more particularly, to an endoscope objective lens that is appropriate for use in such a configuration that a prism for deflecting a light path or the like is disposed between the endoscope objective lens and an image formation surface, and an endoscope including the endoscope objective lens.

2. Description of the Related Art

Generally, endoscopes are used for observing the inside of a patient's body, performing treatment for a patient, and the like. As the endoscope, widely used is a direct-view type endoscope that is used to observe in the longitudinal direction of an insertion section. In the direct-view type endoscope, an observation objective lens is disposed in a front end of the insertion section, which will be inserted into the inside of a human body, of the endoscope, and a solid-state imaging device is disposed on an image formation surface of the objective lens. In this type of the endoscopes, a light receiving surface of the solid-state imaging device is frequently disposed to be parallel to the longitudinal direction of the insertion section. Under such a configuration, generally, a light-path deflecting prism for deflecting a light path by 90 degrees is disposed between the objective lens and the solid-state imaging device.

In an optical system of the endoscope having the above configuration, it is required to have a long distance from a final surface of the objective lens in which the light-path deflecting prism is inserted to the image formation position, that is, a long back focal length. The applicant has described an endoscope objective lens having a long back focal length and having a four-group, six-element lens configuration in JP 2004-205779 A (corresponding to US 2004/0125469 A).

However, it is preferable that a filter such as a low-pass filter and/or an infrared cut filter is inserted between the final surface of the objective lens and the image location as well as the light-path deflecting prism that is minimum required. Also, in consideration of working accuracy, assembling accuracy, and the like of the light-path deflecting prism, the filter and the like, it is desired to have a longer back focal length.

On the other hand, in order to increase the depth of field, endoscope objective lens often include an optical system having a large F number, that is, a dark optical system. Accordingly, it is less likely that spherical aberration, coma aberration, and the like become significant factor to determine the image quality. Also, the lateral chromatic aberration would become a major factor to determine the image quality. In particular, in accordance with a trend of high density solid-state imaging devices, it is required to sufficiently correct the lateral chromatic aberration. As the lateral chromatic aberration increases, not only color blurring in a peripheral image occurs but also resolution in the peripheral portion decreases, which has influence on the observation or diagnosis for the inside of a lumen with the endoscope.

Accordingly, both a long back focal length and a good lateral chromatic aberration are required. In order to correct the lateral chromatic aberration, it is advantageous to dispose an optical member for correcting the lateral chromatic aberration in a position far apart from the aperture diaphragm. Also, as the optical member is disposed in a position closer to the image formation surface, a strong correction effect can be achieved. However, as the back focal length increases, the maximum height of light rays in this optical member decreases, and the effect of correction of the lateral chromatic aberration is weakened, thereby making it difficult to correct. In particular, in an optical system having the back focal length 2.5 or more times as long as the focal length, no lens is disposed in a position close to the image formation surface. Therefore, it is not easy to correct the lateral chromatic aberration.

SUMMARY OF THE INVENTION

In view of the above-described circumstances, the invention provides an endoscope objective lens that has a long back focal length in comparison with a focal length and can sufficiently correct the lateral chromatic aberration.

According to an aspect of the invention, an endoscope objective lens includes, in order from an object side, a negative first lens, a first cemented lens, a stop, a positive fourth lens and a second cemented lens. The negative first lens has a concave surface directed to an image side. The first cemented lens is formed by cementing a second lens and a third lens. One of the second and third lenses is positive and, the other is negative. The positive fourth lens includes a flat surface or a surface having a larger absolute value in radius of curvature, directed to the object side. The second cemented lens is formed by cementing a positive fifth lens and a negative sixth lens in order from the object side. The second cemented lens has a positive refractive power as a whole. The endoscope objective lens satisfies the following conditional expressions (1) and (2)

$$\frac{f^2 \times |v_5 - v_6|}{|R_A| \times (Bf + d_6/n_6)} > 10 \quad (1)$$

$$Bf/f > 2.5 \quad (2)$$

where f denotes a focal length of the entire system, Bf denotes an air-equivalent length of a back focal length of the entire system, $v_5$ denotes an Abbe number of the fifth lens, $v_6$ denotes an Abbe number of the sixth lens, $R_A$ denotes a radius of curvature of a cemented surface between the fifth and sixth lenses, $d_6$ is a center thickness of the sixth lens, and $n_6$ is an index of refraction of the sixth lens.

Here, the order of arrangement of the positive lens and the negative lens which constitute the first cemented lens is not limited to a specific order. Thus, any one of the positive lens and the negative lens may be disposed on the object side.

In the above endoscope objective lens, the configuration of the respective lenses is appropriately selected. In particular, the second cemented lens is configured to satisfy the conditional expression (1), thereby sufficiently correcting the lateral chromatic aberration. Also, the whole system is configured to satisfy the conditional expression (2), thereby ensuring a long back focal length.

According to another aspect of the invention, an endoscope objective lens includes, in order from an object side, a negative first lens, a first cemented lens, a stop, a positive fourth lens and a second cemented lens. The negative first lens has a concave surface directed to an image side. The first cemented lens is formed by cementing a second lens and a third lens. One of the second and third lenses is positive and, the other is negative. The positive fourth lens includes a flat surface or a surface having a larger absolute value in radius of curvature, directed to the object side. The second cemented lens is formed by cementing a negative fifth lens and a positive sixth lens in order from the object side. The second cemented lens has a positive refractive power as a whole. The endoscope objective lens satisfies the following conditional expressions (1)' and (2)

$$\frac{f^2 \times |v_5 - v_6|}{|R_A| \times (Bf + d_6/n_6)} > 8' \quad (1)'$$

$$Bf/f > 2.5 \quad (2)$$

where f denotes a focal length of the entire system, Bf denotes an air-equivalent length of a back focal length of the entire system, $v_5$ denotes an Abbe number of the fifth lens, $v_6$ denotes an Abbe number of the sixth lens, $R_A$ denotes a radius of curvature of a cemented surface between the fifth and sixth lenses, $d_6$ is a center thickness of the sixth lens, and $n_6$ is an index of refraction of the sixth lens.

Here, the order of arrangement of the positive lens and the negative lens which constitute the first cemented lens is not limited to a specific order. Thus, any one of the positive lens and the negative lens may be disposed on the object side.

In the above endoscope objective lens, the configuration of the respective lenses is appropriately selected. In particular, the second cemented lens is configured to satisfy the conditional expression (1)', thereby sufficiently correcting the lateral chromatic aberration. Also, the whole system is configured to satisfy the conditional expression (2), thereby ensuring a long back focal length.

It is preferable that the above-described endoscope objective lens satisfies at least one of the following conditional expressions (3) to (5)

$$1.00 < |d/f_1| < 2.00 \quad (3)$$

$$0.95 < f/h < 1.05 \quad (4)$$

$$15.0 < |v_2 - v_3| \quad (5)$$

where d denotes an air-equivalent distance, on an optical axis, from an apex of the concave surface of the first lens on the image side to the stop, $f_1$ denotes a focal length of the first lens, h denotes a maximum image height, $v_2$ is an Abbe number of the second lens, and $v_3$ is an Abbe number of the third lens.

In addition, according to further another aspect of the invention, an endoscope includes the above endoscope objective lens.

Respective values in the above-described conditional expressions (1) to (5) and (1)' are calculated using a d-line (wavelength of 587.6 nm) as a reference wavelength. In descriptions of this specification, the d-line will be used as a reference wavelength, unless otherwise mentioned.

According to the invention, the configurations of respective lenses are appropriately selected so as to satisfy the conditional expressions (1) and (2) or the conditional expressions (1)' and (2). Accordingly, an endoscope objective lens that has a long back focal length in comparison with a focal length and has a well corrected lateral chromatic aberration, and an endoscope including the endoscope objective lens can be provided.

DETAILED DESCRIPTION OF EMBODIMENTS OF THE INVENTION

Hereinafter, an endoscope objective lens according to embodiments of the invention will be described with reference to the accompanying drawings.

Figure 1:
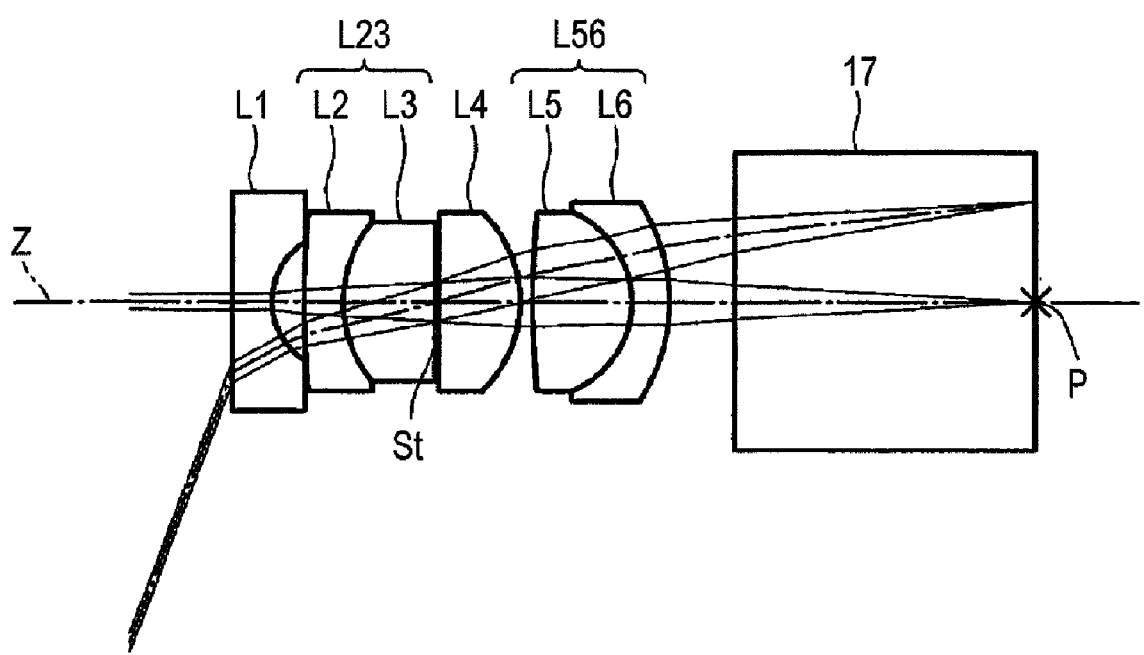
FIG. 1 is a diagram showing the configuration of an endoscope objective lens according to a first embodiment of the invention.
Figure 2:
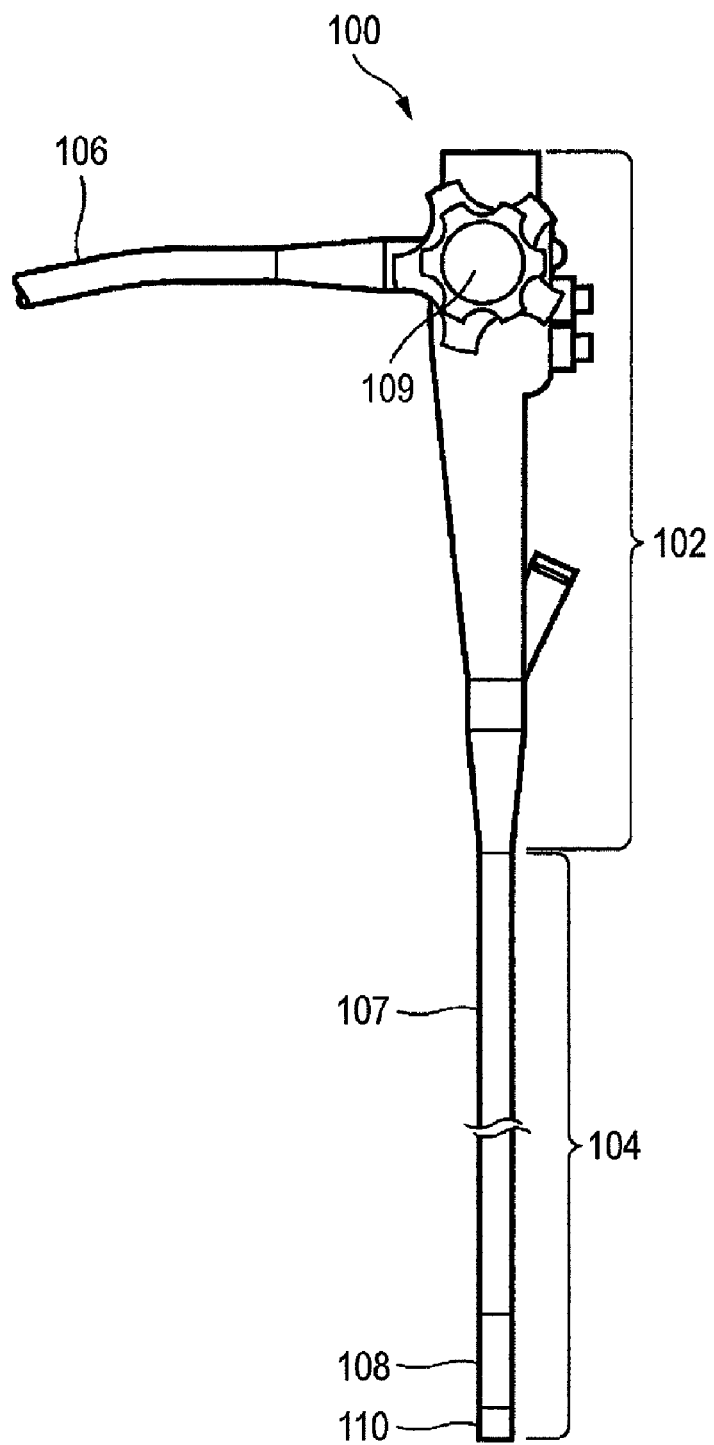
FIG. 2 is a diagram showing the schematic configuration of an endoscope according to the first embodiment of the invention.
Figure 3:
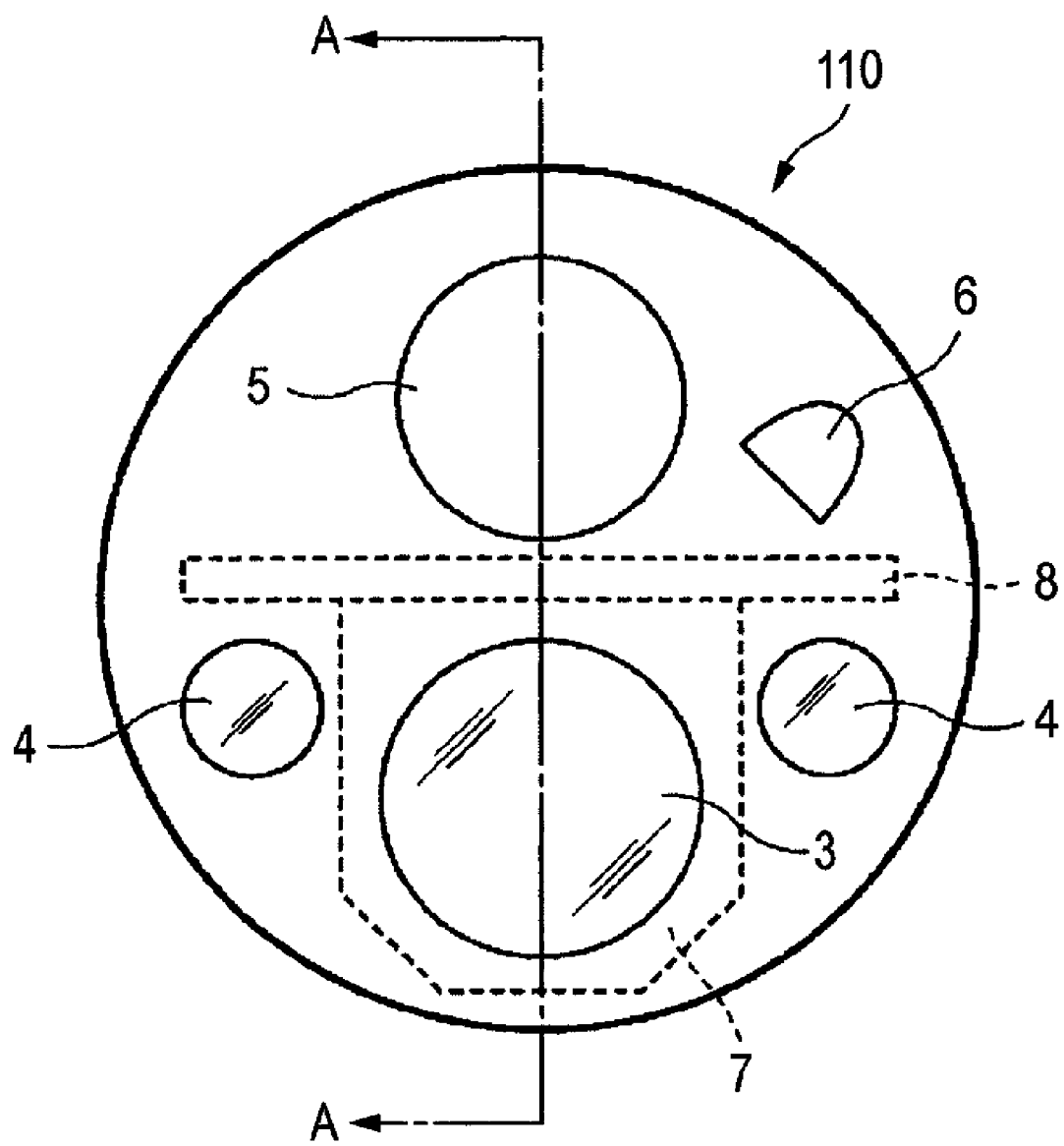
FIG. 3 is a plan view of a front end surface of an insertion section in which the endoscope objective lens according to the first embodiment of the invention is disposed.
Figure 4:
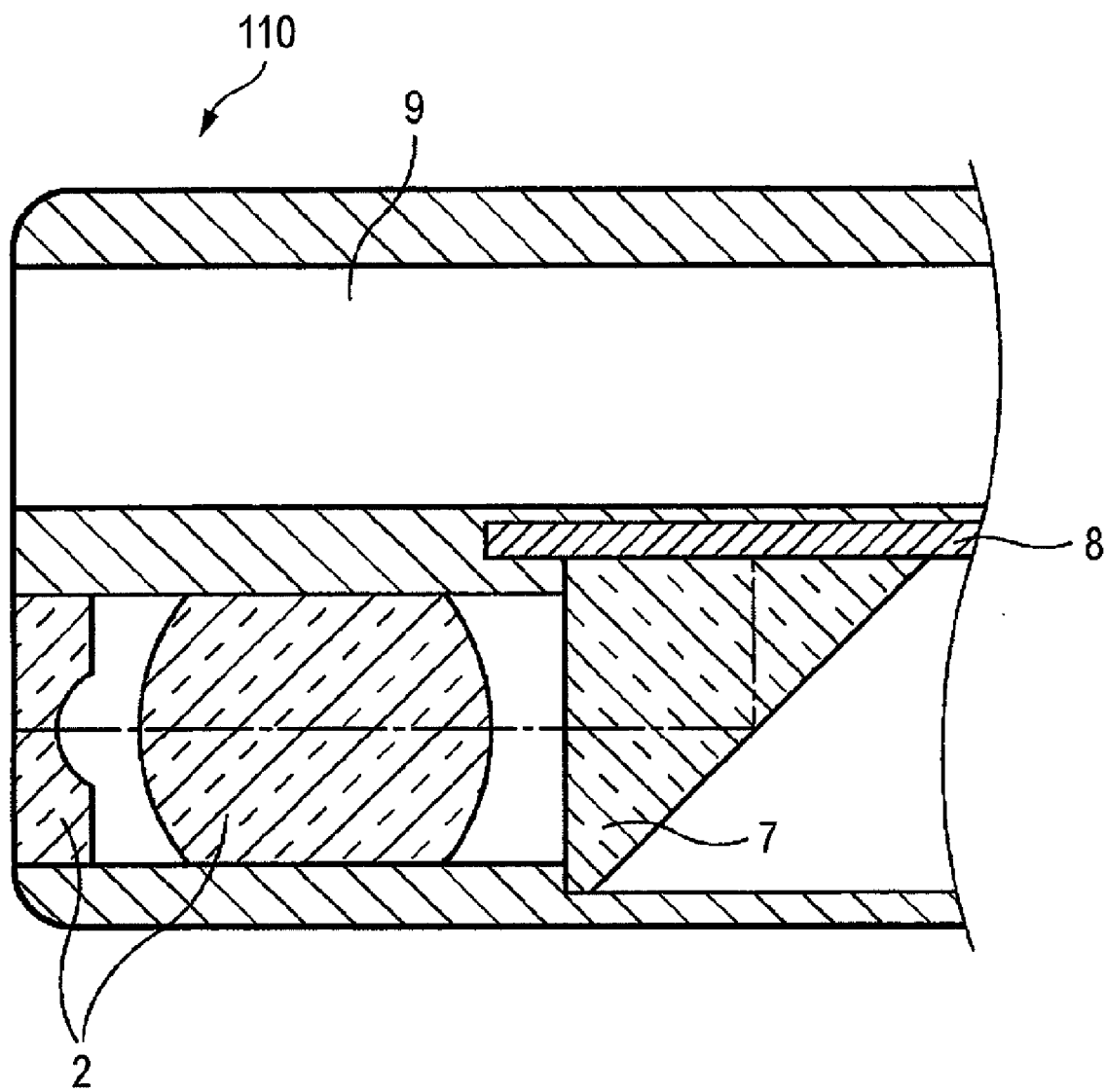
FIG. 4 is a section view of a major part of the front end portion taken along the line A-A shown in FIG. 3.

FIG. 1 is a light-path diagram in which a transmitted light beam is drawn in a section view of an endoscope objective lens according to a first embodiment of the invention. The endoscope objective lens is disposed in a front end of an insertion section of an endoscope. FIG. 2 is the configuration of the whole endoscope. FIGS. 3 and 4 are a plan view and a section view that show schematic configurations with the endoscope objective lens being disposed in the insertion section.

First, the schematic configuration of the endoscope will be described with reference to FIG. 2. As shown in FIG. 2, the endoscope 100 mainly includes an operation section 102, an insertion section 104, and a connector section for drawing out drawing a universal code 106.

The insertion section 104, which is to be inserted into a patient's body, is connected to the front end side of the operation section 102. The universal code 106 is drawn out from the base end side of the operation section 102 for connection to the connection section, which is used for connection to a light source device or the like.

The most part of the insertion section 104 is a soft part 107 that can be bent in an arbitrary direction along an insertion path. A curving portion 108 is connected to the front end of the soft part 107. A front-end hard portion 110 is connected to the front end of the curving portion 108, sequentially. The curving portion 108 is provided so as to direct the front-end hard portion 110 toward a desired direction. By rotating a curving scan knob 109 disposed in the operation section 102, a curving operation can be performed.

The connection section is connected to a monitor for reproducing an image and a light source device that are not shown in the figure. Illumination light from the light source device is transmitted through a light guide included in the universal code 106 and is emitted from an illumination window 4 of the front-end hard portion 110. Also, an image obtained through the endoscope objective lens 2 provided in the front-end hard portion 110 is photoelectrically converted by a solid-state imaging device 8, then transmitted through a signal cable included in the universal code 106, and displayed on a monitor.

Next, the schematic configuration of the front-end hard portion 110 in which the endoscope objective lens 2 according to this embodiment is disposed will be described with reference to FIGS. 3 and 4. FIG. 3 is a plan view showing a front end surface of the front-end hard portion 110. FIG. 4 is a section view of a major part of the front-end hard portion 110 that is taken along the line A-A in FIG. 3 and that is a section including an optical axis of the endoscope objective lens 2.

As shown in FIG. 3, provided on the front end surface of the front-end hard portion 110 are: an observation window 3 that is an outer surface of the endoscope objective lens 2; the two illumination windows 4 disposed on both sides of the observation window 3; a treatment tool derivation opening 5, and an air/water nozzle 6 are provided.

As shown in FIG. 4, provided inside the front-end hard portion 110 are: the endoscope objective lens 2 having an optical axis aligned to be parallel to the longitudinal direction of the insertion section 104; a light-path deflecting prism 7 for deflecting a light path of the endoscope objective lens 2 on the image side by 90 degrees; and the solid-state imaging device 8 bonded to the light-path deflecting prism 7 such that a light receiving surface of the solid-state imaging device 8 is parallel to the longitudinal direction of the insertion section 104. By disposing the solid-state imaging device 8 as described above, a direct-view type observation system is configured in the lower half part of the front-end hard portion 110 shown in FIG. 4 and a treatment tool insertion channel 9 is configured in the upper half part of the front-end hard portion 110 shown in FIG. 4. That is, a plurality of elements are disposed inside the insertion section having a small diameter.

Although the solid-state imaging device 8 has a cover glass for protecting the light receiving surface, the solid-state imaging device and the cover glass are illustrated as the solid-state imaging device 8 in FIGS. 3 and 4. The endoscope objective lens 2 shown in FIG. 4 does not represent its shape but is illustrated conceptually. In FIG. 4, an optical axis of an observation optical system configured by the endoscope objective lens 2 is represented by dotted lines. As can be seen in FIG. 4, in order to provide the light-path deflecting prism 7 between the endoscope objective lens 2 and the image formation surface, the endoscope objective lens 2 is required to have a long back focal length.

Next, the configuration of an endoscope objective lens according to the first embodiment of the invention will be described with reference to FIG. 1. The configuration example shown in FIG. 1 corresponds to the lens configuration of Example 1 which will be described later.

The endoscope objective lens according to the first embodiment has a four-group, six-element lens configuration. The endoscope objective lens is configured by arranging, in order from the object side: a negative first lens L1 having a concave surface directed to the image side; a first cemented lens L23 formed by cementing a second lens L2 and a third lens L3, one of the second lens L2 and the third lens L3 being positive and, the other is negative; an aperture diaphragm St; a positive fourth lens L4 having a flat surface or a surface having a larger absolute value in radius of curvature, directed to the object side; and a second cemented lens L56 formed by cementing a positive fifth lens L5 and a negative sixth lens L6 in order from the object side, the second cemented lens L56 having a positive refracting power as a whole.

A parallel flat plate 17 disposed between the endoscope objective lens shown in FIG. I and the image formation surface is an optical member that may include (a) the light-path deflecting prism 7 and (b) the cover glass for the solid-state imaging device 8, which are shown in FIG. 4, and (c) a low-pass filter and/or (d) an infrared cut filter, which are not shown in FIG. 4 but may be inserted. Here, the surface, on the image side, of the parallel flat plate 17 is configured to be identical to the image formation position P of the whole system of the endoscope objective lens. The aperture diaphragm St shown in FIG. 1 does not represent its shape and its size, but represents its position on the optical axis Z.

The endoscope objective lens according to the first aspect is configured so as to satisfy the following Conditional Expressions (1) and (2).

$$\frac{f^2 \times |\nu_5 - \nu_6|}{|R_A| \times (Bf + d_6/n_6)} > 10 \quad (1)$$

$$Bf/f > 2.5 \quad (2)$$

where f denotes a focal length of the entire system, Bf denotes a back focal length (air-equivalent length) of the entire system, $\nu_5$ denotes an Abbe number of the fifth lens, $\nu_6$ denotes an Abbe number of the sixth lens, $R_A$ denotes a radius of curvature of a cemented surface between the fifth and sixth lenses, $d_6$ is a center thickness of the sixth lens, and $n_6$ is an index of refraction of the sixth lens.

Also, it is preferable that the endoscope objective lens according to the first embodiment satisfies the following Conditional Expressions (3) to (5).

$$1.00 < |d/f_1| < 2.00 \quad (3)$$

$$0.95 < f/h < 1.05 \quad (4)$$

$$15.0 < |\nu_2 - \nu_3| \quad (5)$$

where d denotes an air-equivalent distance, on an optical axis, from an apex of the concave surface of the first lens on the image side to the aperture diaphragm, $f_1$ denotes a focal length of the first lens, h denotes a maximum image height, $\nu_2$ is an Abbe number of the second lens, and $\nu_3$ is an Abbe number of the third lens.

The operation and advantages of the endoscope objective lens having the above configuration will now be described in detail. Conditional Expression (1) represents an appropriate degree of correction of lateral chromatic aberration of the cemented lens L56 formed of the fifth lens L5 and the sixth lens L6 in main consideration of a difference in Abbe number therebetween and the cemented surface therebetween. Conditional Expression (1) may be transformed into the following expression (1-1).

$$\frac{|\nu_5 - \nu_6|}{\frac{|R_A|}{f} \times \frac{(Bf + d_6/n_6)}{f}} > 10 \quad (1-1)$$

As is shown in Conditional Expression (1-1), the left side of Conditional Expression (1) is constituted by a first term that is a difference in Abbe number between the fifth lens L5 and the sixth lens L6, a second term that is the radius of curvature of the cemented surface which is normalized by the focal length, and a third term that is the sum of the back focal length of the whole system and the air-equivalent thickness of the sixth lens L6 which is normalized by the focal length.

The first to third terms represent three conditions advantageous for correction of the lateral chromatic aberration. In other words, the first term suggests a condition that the difference in Abbe number between the two positive and negative lenses, which form the cemented lens, is large, the second term suggests a condition that the radius of curvature of the cemented surface is small, and the third term suggests a condition that the cemented surface is close to the image formation position. The left side of Conditional Expression (1) has the first term in the numerator and the second and third terms in the denominator, and as this value increases, the condition is advantageous for correction of the lateral chromatic aberration. When the endoscope objective lens falls below the lower limit of Conditional Expression (1), it is difficult to maintain good lateral chromatic aberration with the back focal length being kept to be 2.5 or more times as long as the focal length in the objective lens according to the first embodiment.

Commonly, in an image formation lens in which chromatic aberration is not correct sufficiently, a focal length for a short wavelength is shorter than that for a long wavelength. Accordingly, both the axial chromatic aberration and the lateral chromatic aberration become negative ("under") for short wavelengths with respect to a reference wavelength. In order to correct the "under" of the lateral chromatic aberration, it is preferable to make the Abbe number of the positive lens be large and the Abbe number of the negative lens be small, on the image side of the aperture diaphragm St.

In particular, the less the Abbe number of the negative lens (the sixth lens L6) constituting a second cemented lens is, the more advantageous it is for correction of the lateral chromatic aberration. Also, it is preferable that the Abbe number ν6 of the sixth lens L6 is set so as to satisfy the following Conditional Expression (6).

$$\nu_6 < 20 \quad (6)$$

Conditional Expression (2) defines an appropriate range of a back focal length ratio that is a ratio of the back focal length to the focal length. By satisfying Conditional Expression (2), the back focal length, which is 2.5 or more times as large as the focal length of the whole system, can be ensured. Accordingly, it becomes easy to insert an optical member, such as the light-path deflecting prism 7, between the lens system and the image formation surface.

Conditional Expression (3) defines an appropriate range of an absolute value of a value obtained by multiplying the air-equivalent length from the apex of the concave surface of the first lens L1 on the image side to the aperture diaphragm St by a power (an inverse of the focal length $f_1$) of the first lens L1. In an optical system such as the objective lens of this embodiment, the angle of view is approximately defined by a distance from the first lens L1 to the aperture diaphragm St. The surface, on the object side, of the first lens L1 which is the lens closest to the object side serves as an observation window that is exposed externally. Therefore, it is preferable that the surface, on the object side, of the first lens L1 has a shape that makes it difficult for dusts to stay. Also, the surface, on the object side, of the first lens L1 is commonly configured as a flat surface or a shape, which is similar to a flat surface and has a large radius of curvature. Therefore, the power of the first lens L1 is substantially defined by the concave surface on the image side. Since the power of the first lens L1, which is the negative lens, largely contributes to a long back focal length, when Conditional Expression (3) is satisfied, the wide angle of view can be achieved while the length of the back focal length is acquired.

In particular, as the value of $d/f_1$ of Conditional Expression (3) increases, it becomes easier to set the back focal length to be long. When $d/f_1$ falls below the lower limit of Conditional Expression (3), the length of the back focal length becomes small. Accordingly, it is difficult to insert the light-path deflecting prism 7. On the other hand, when $d/f_1$ exceeds the upper limit of Conditional Expression (3), the back focal length can be set to be long. However, in such a case, the length of the back focal length more than needed would increase the entire length of the optical system and such an endoscope objective lens is not preferable. Also, as $d/f_1$ further exceeds the upper limit of Conditional Expression (3), it becomes more difficult to correct the filed curvature in a case where the power of the first lens L1 is large.

Conditional Expression (4) is one set for ensuring relative illumination in a super-wide angle objective lens. This conditional expression (4) defines an appropriate range of a ratio of the focal length f of the whole system to the maximum image height h. The reason why the value of this ratio is set to be approximately equal to one as in Conditional Expression (4) is as follows.

In a wide-angle lens, it is well known that a decrease in the relative illumination is prominent in accordance with a cosine fourth law in the case where negative distortion is removed. For example, in the case where the angle of view is 140 degrees, the relative illumination falls up to 1.37% of the brightness of light in the center and cannot be used. When significance is attached to the relative illumination, the required distortion of the optical system is about $(\tan \omega^{-1} - 1) \times 100$ (%), where $\omega$ denotes a half angle of view. The value obtained as described above well matches the amount of distortion of an optical system having an angle of view about 140 degrees.

Here, the amount of distortion D (%) is defined as $$D = 100 \times (Y_{real} - Y_{ideal})/Y_{ideal}$$

where $Y_{real}$ denotes an actual image height and $Y_{ideal}$ denotes an ideal image height. When the above-described "$(\tan \omega^{-1} - 1) \times 100$" as the amount of distortion D and when $Y_{real}$ is set to be the maximum image height h, since $Y_{ideal}$ is $f \times \tan \omega$, the ratio of the maximum image height h to the focal length f becomes one. In Conditional Expression (4), a range of upper 5% and lower 5% from this value is given, and the condition is used for ensuring the relative illumination for a super-wide angle lens.

Conditional Expression (5) defines an appropriate range of a difference in Abe number between the positive lens and the negative lens, which constitute the first cemented lens L23. By satisfying Conditional Expression (5), the lateral chromatic aberration and the axial chromatic aberration can be corrected well. Furthermore, in this objective lens, it is preferable that the Abbe number of the negative lens constituting the first cemented lens L23 is greater than that of the positive lens constituting the first cemented lens L23.

Figure 19:
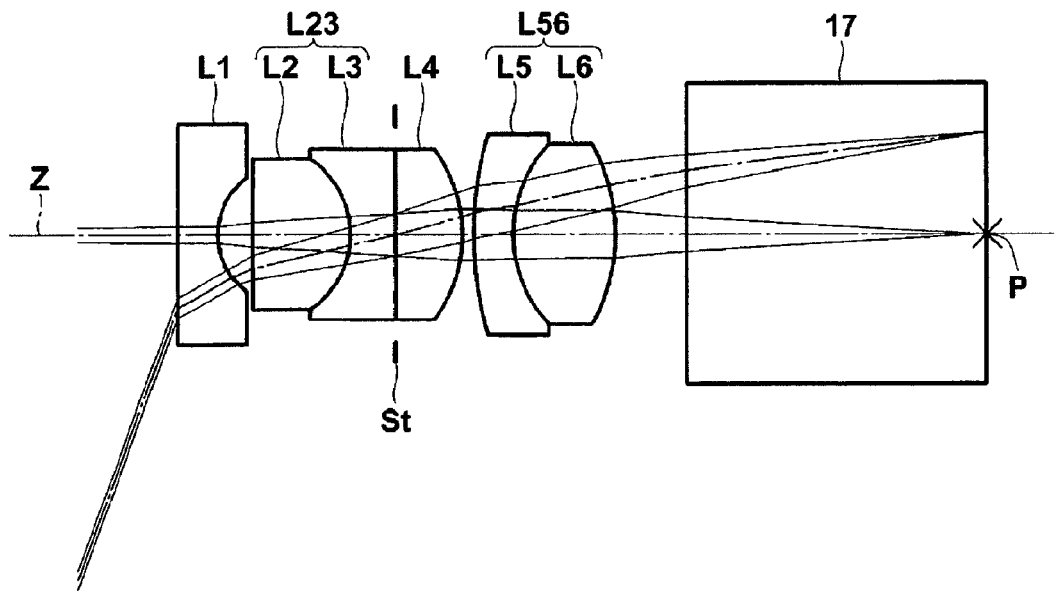
FIG. 19 is a diagram showing the lens configuration of an endoscope objective lens according to a second embodiment of the invention.

Next, an endoscope objective lens according to a second embodiment of the invention will be described. FIG. 19 is a light-path diagram in which transmitted light beam is drawn in a section view of the endoscope objective lens according to the second embodiment of the invention. The endoscope objective lens is provided in the front end of the insertion section of the endoscope. The configuration of the endoscope is the same as that according to the first embodiment, and description thereon will be omitted here.

Next, the configuration of the endoscope objective lens according to the second embodiment of the invention will be described with reference to FIG. 19. The configuration example shown in FIG. 19 corresponds to the configuration of a lens of Example 7 which will be described later.

The endoscope objective lens according to the second embodiment has a four-group, six-element lens configuration. The endoscope objective lens is formed by arranging, in order from the object side: a negative first lens L1 having a concave surface directed to the image side; a first cemented lens L23 formed by cementing a second lens L2 and a third lens L3, one of the second lens L2 and the third lens L3 being positive and, the other being negative; an aperture diaphragm St; a positive fourth lens L4 having a flat surface or a surface having a larger absolute value in radius of curvature, directed to the object side; and a second cemented lens L56 formed by cementing a negative fifth lens L5 and a positive sixth lens L6 in order from the object side, the second cemented lens L56 having a positive refracting power as a whole.

A parallel flat plate 17 disposed between the endoscope objective lens shown in FIG. 19 and the image formation surface is an optical member that may include (a) the light-path deflecting prism 7 and (b) the cover glass for the solid-state imaging device 8, which are shown in FIG. 4, and (c) a low-pass filter and/or (d) an infrared cut filter which are not shown in FIG. 4 but may be inserted. Here, the surface, on the image side, of the parallel flat plate 17 is configured to be identical to the image formation position P of the whole system of the endoscope objective lens. The aperture diaphragm St shown in FIG. 19 does not represent its shape and its size but represents its position on the optical axis Z.

The endoscope objective lens according to the second embodiment is configured so as to satisfy the following Conditional Expressions (1)' and (2):

$$\frac{f^2 \times |\nu_5 - \nu_6|}{|R_A| \times (Bf + d_6/n_6)} > 8' \quad (1)'$$

$$Bf/f > 2.5 \quad (2)$$

where f denotes a focal length of the entire system, Bf denotes a back focal length (air-equivalent length) of the entire system, $\nu_5$ denotes an Abbe number of the fifth lens, $\nu_6$ denotes an Abbe number of the sixth lens, $R_A$ denotes a radius of curvature of a cemented surface between the fifth and sixth lenses, $d_6$ is a center thickness of the sixth lens, and $n_6$ is an index of refraction of the sixth lens.

Also, it is preferable that the endoscope objective lens according to the second embodiment satisfies at least one of Conditional Expressions (3) to (5), which are described in the first embodiment.

The operation and advantage of the above-described endoscope objective lens according to the second embodiment are almost the same as those according to the first embodiment.

Also, the less the Abbe number of the negative lens (the fifth lens L5) constituting the second cemented lens is, the more advantageous it is for correction of the lateral chromatic aberration. Furthermore, it is preferable that the Abbe number $\nu 5$ of the fifth lens L5 satisfies the following Conditional Expression (6)'.

$$\nu_5 < 20 \quad (6)'$$

EXAMPLES

Next, specific examples of the endoscope objective lens according to the first and second embodiments with specific numerical values will be described. Examples 1 to 6 correspond to the first embodiment, and Examples 7 to 12 correspond to the second embodiment.

Example 1

Figure 5:
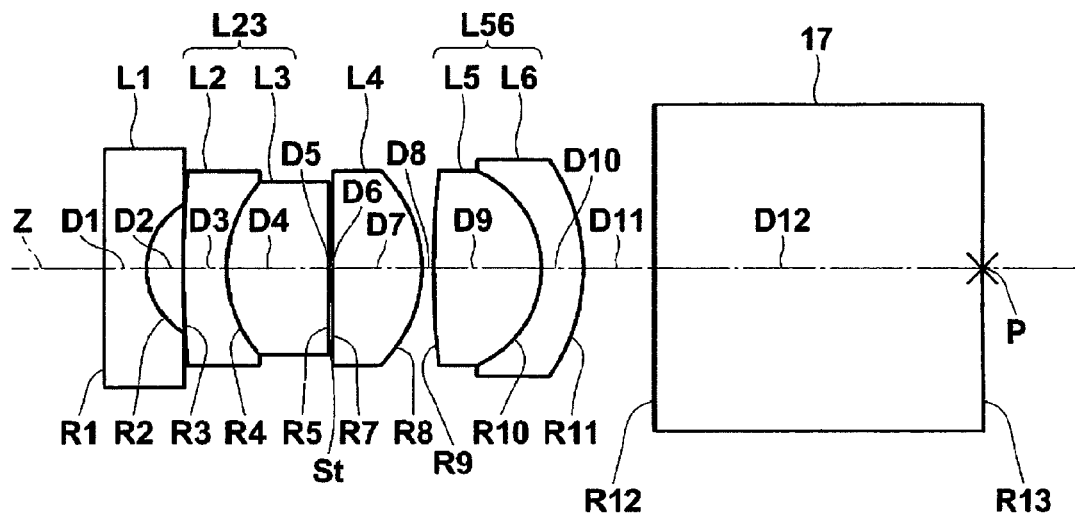
FIG. 5 is a diagram showing the lens configuration of an endoscope objective lens according to Example 1 of the invention.

The specification values of an endoscope objective lens according to Example 1 are shown in Table 1. The configuration diagram of the lens of Example 1 is shown in FIG. 5. In FIG. 5, the left side is the object side, and the right side is the image side. In Table 1, the surface number 'first' is assigned to a surface that is a constituent element disposed closest to the object side, and surface numbers 'i-th' (i=1, 2, 3, ... ) are assigned to respective surfaces while the surface number increases as advancing to the image side. Also, Ri denotes the radius of curvature of the i-th surface, and Di denotes a surface separation, on the optical axis Z, between the i-th surface and the (i+1)-th surface. Furthermore, ndj denotes an index of refraction of an j-th (j=1, 2, 3) lens or parallel flat plate 17 at a d-line (wavelength of 587.6 nm), wherein the lens number 'first' is assigned to the lens disposed closest to the object side, and lenses numbers increases as advancing to the image side. vdj denotes an Abbe number of the j-th lens or parallel flat plate 17 at the d-line. In Table 1, the unit of the radius of curvature and the unit of the surface gap are mm. In Table 1, the radius of curvature is set to be positive in the case where a lens is convex toward the object side, and the radius of curvature is set to be negative in the case where a lens is convex toward the image side.

The symbols shown in Table 1 and FIG. 5 denote elements including the aperture diaphragm St and the parallel flat plate 17. The symbols Ri and Di shown in FIG. 5 correspond to Ri and Di shown in Table 1. As shown in Table 1, between the third lens L3 and the fourth lens L4, the aperture diaphragm St is disposed. D5 shown in FIG. 5 denotes a surface separation between the third lens L3 and the aperture diaphragm St, and D6 denotes a surface separation between the aperture diaphragm St and the fourth lens L4. The aperture diaphragm St in the figure does not represent its shape and its size but represents its position on the optical axis Z. The symbols shown in FIG. 5 and Table 1 have the same meanings in the other Examples.

TABLE 1

| Example 1 EXAMPLE 1 | | | | |
|---|---|---|---|---|
| Surface number | Ri | Di | ndj | vdj |
| 1 | ∞ | 0.38362 | 1.88300 | 40.8 |
| 2 | 0.7166 | 0.31574 | | |
| 3 | 10.6926 | 0.38362 | 1.83481 | 42.7 |
| 4 | 1.2458 | 0.91682 | 1.84666 | 23.8 |
| 5 | ∞ | 0.01918 | | |
| 6 (Aperture diaphragm) | ∞ | 0.01918 | | |
| 7 | ∞ | 0.81467 | 1.62041 | 60.3 |
| 8 | −1.2569 | 0.10960 | | |
| 9 | 8.2976 | 0.98621 | 1.62041 | 60.3 |
| 10 | −0.9816 | 0.38362 | 1.92286 | 18.9 |
| 11 | −1.7995 | 0.63669 | | |

TABLE 1-continued

| Example 1 EXAMPLE 1 | | | | |
|---|---|---|---|---|
| Surface number | Ri | Di | ndj | vdj |
| 12 | ∞ | 3.00000 | 1.51633 | 64.1 |
| Image plane | ∞ | | | |

Example 2

Figure 6:
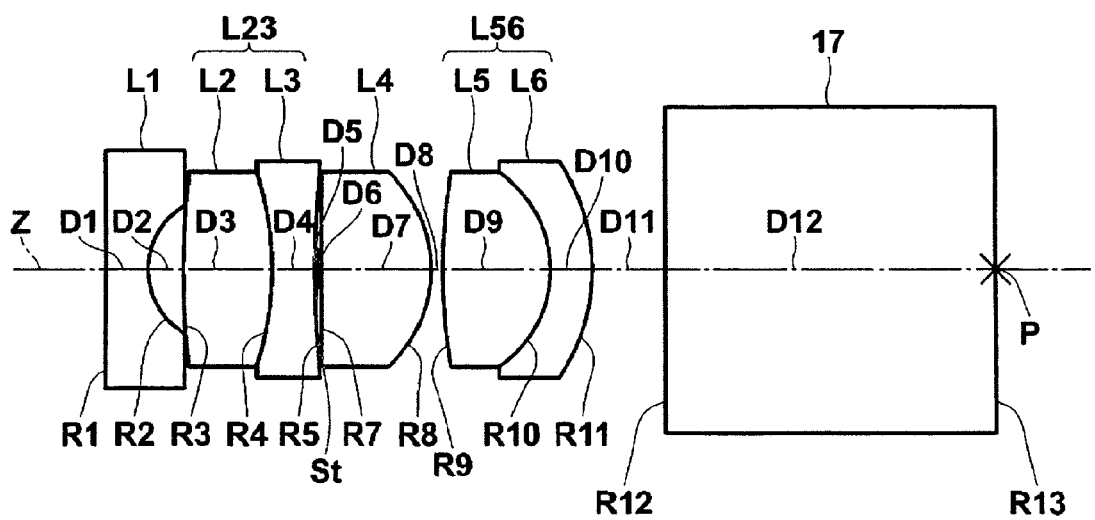
FIG. 6 is a diagram showing the lens configuration of an endoscope objective lens according to Example 2 of the invention.

The specification values of an endoscope objective lens according to Example 2 are shown in Table 2. The configuration diagram of the lens of Example 2 is shown in FIG. 6. The symbols Ri and Di shown in FIG. 6 correspond to Ri and Di shown in Table 2.

TABLE 2

| EXAMPLE 2 | | | | |
|---|---|---|---|---|
| Surface number | Ri | Di | ndj | vdj |
| 1 | ∞ | 0.38128 | 1.88300 | 40.8 |
| 2 | 0.7256 | 0.30504 | | |
| 3 | 8.2441 | 0.78564 | 1.92286 | 18.9 |
| 4 | −3.0060 | 0.38128 | 1.83481 | 42.7 |
| 5 | 10.8937 | 0.02179 | | |
| 6 (Aperture diaphragm) | ∞ | 0.03813 | | |
| 7 | ∞ | 1.00479 | 1.62041 | 60.3 |
| 8 | −1.2345 | 0.10894 | | |
| 9 | 5.3069 | 0.98045 | 1.62041 | 60.3 |
| 10 | −1.1058 | 0.38128 | 2.14352 | 17.8 |
| 11 | −1.8364 | 0.65520 | | |
| 12 | ∞ | 3.00000 | 1.51633 | 64.1 |
| Image plane | ∞ | | | |

Example 3

Figure 7:
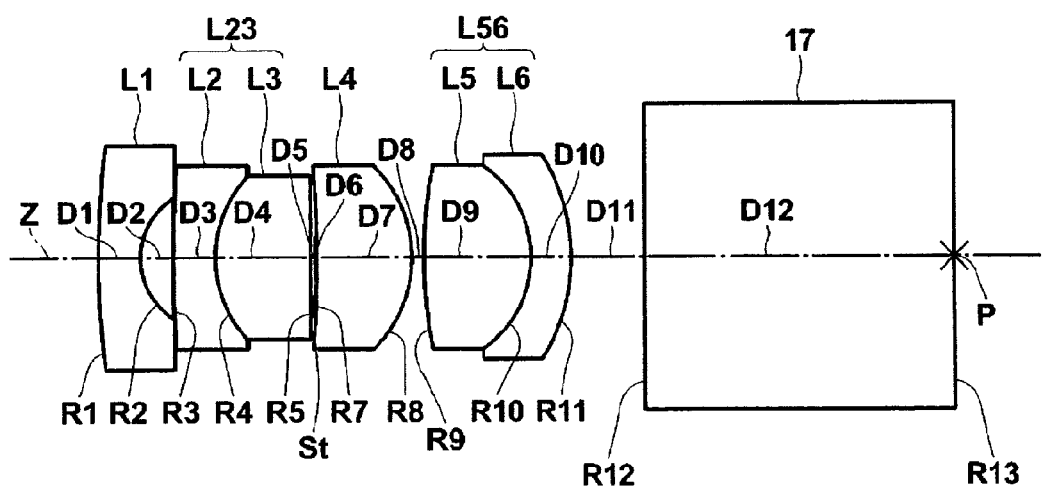
FIG. 7 is a diagram showing the lens configuration of an endoscope objective lens according to Example 3 of the invention.

The specification values of an endoscope objective lens according to Example 3 are shown in Table 3. The configuration diagram of the lens of Example 3 is shown in FIG. 7. The symbols Ri and Di shown in FIG. 7 correspond to Ri and Di shown in Table 3.

TABLE 3

| EXAMPLE 3 | | | | |
|---|---|---|---|---|
| Surface number | Ri | Di | ndj | vdj |
| 1 | 9.0671 | 0.39669 | 2.00950 | 29.4 |
| 2 | 0.7131 | 0.31774 | | |
| 3 | 15.0254 | 0.39669 | 1.83481 | 42.7 |
| 4 | 1.1745 | 0.91980 | 1.92286 | 18.9 |
| 5 | ∞ | 0.03967 | | |
| 6 (Aperture diaphragm) | ∞ | 0.02042 | | |
| 7 | −11.3339 | 0.91635 | 1.62041 | 60.3 |
| 8 | −1.2695 | 0.11334 | | |
| 9 | 4.9733 | 1.02432 | 1.62041 | 60.3 |
| 10 | −1.1039 | 0.39669 | 2.14352 | 17.8 |
| 11 | −1.8602 | 0.73389 | | |
| 12 | ∞ | 3.00000 | 1.51633 | 64.1 |
| Image plane | ∞ | | | |

Example 4

Figure 8:
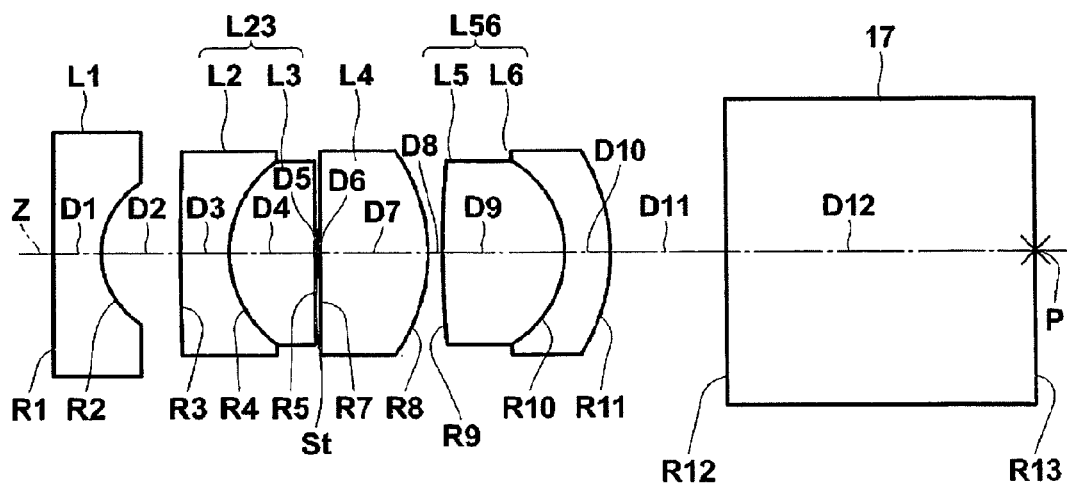
FIG. 8 is a diagram showing the lens configuration of an endoscope objective lens according to Example 4 of the invention.

The specification values of an endoscope objective lens according to Example 4 are shown in Table 4. The configuration diagram of the lens of Example 4 is shown in FIG. 8. The symbols Ri and Di shown in FIG. 8 correspond to Ri and Di shown in Table 4.

TABLE 4

EXAMPLE 4

| Surface number | Ri | Di | ndj | vdj |
|---|---|---|---|---|
| 1 | ∞ | 0.45634 | 1.88300 | 40.8 |
| 2 | 0.8459 | 0.75503 | | |
| 3 | 35.8721 | 0.45634 | 1.83481 | 42.7 |
| 4 | 1.1120 | 0.82983 | 1.84666 | 23.8 |
| 5 | ∞ | 0.02282 | | |
| 6 (Aperture diaphragm) | ∞ | 0.02282 | | |
| 7 | ∞ | 1.04293 | 1.62041 | 60.3 |
| 8 | −1.7282 | 0.13038 | | |
| 9 | 10.4434 | 1.17347 | 1.62041 | 60.3 |
| 10 | −1.0432 | 0.45634 | 1.92286 | 18.9 |
| 11 | −1.8508 | 1.12318 | | |
| 12 | ∞ | 3.00000 | 1.51633 | 64.1 |
| Image plane | ∞ | | | |

Example 5

Figure 9:
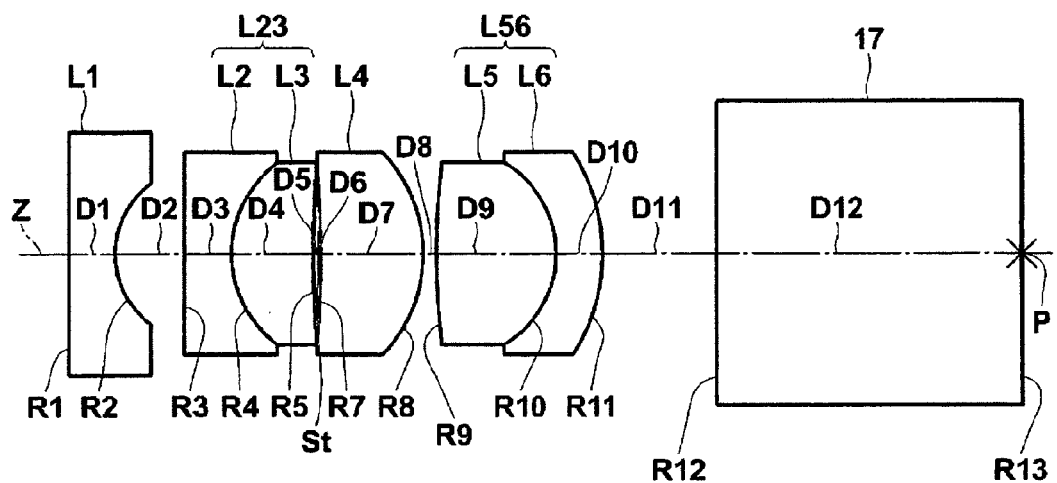
FIG. 9 is a diagram showing the lens configuration of an endoscope objective lens according to Example 5 of the invention.

The specification values of an endoscope objective lens according to Example 5 are shown in Table 5. The configuration diagram of the lens of Example 5 is shown in FIG. 9. The symbols Ri and Di shown in FIG. 9 correspond to Ri and Di shown in Table 5.

TABLE 5

EXAMPLE 5

| Surface number | Ri | Di | ndj | vdj |
|---|---|---|---|---|
| 1 | ∞ | 0.45595 | 1.88300 | 40.8 |
| 2 | 0.8896 | 0.66220 | | |
| 3 | ∞ | 0.45595 | 1.83481 | 42.7 |
| 4 | 1.1285 | 0.80093 | 1.84666 | 23.9 |
| 5 | 13.0273 | 0.04560 | | |
| 6 (Aperture diaphragm) | ∞ | 0.02347 | | |
| 7 | −13.0273 | 0.98678 | 1.62041 | 60.3 |
| 8 | −1.4646 | 0.13027 | | |
| 9 | 7.6447 | 1.17245 | 1.62041 | 60.3 |
| 10 | −1.0422 | 0.45595 | 1.92286 | 18.9 |
| 11 | −1.8677 | 1.11783 | | |
| 12 | ∞ | 3.00000 | 1.51633 | 64.1 |
| Image plane | ∞ | | | |

Example 6

Figure 10:
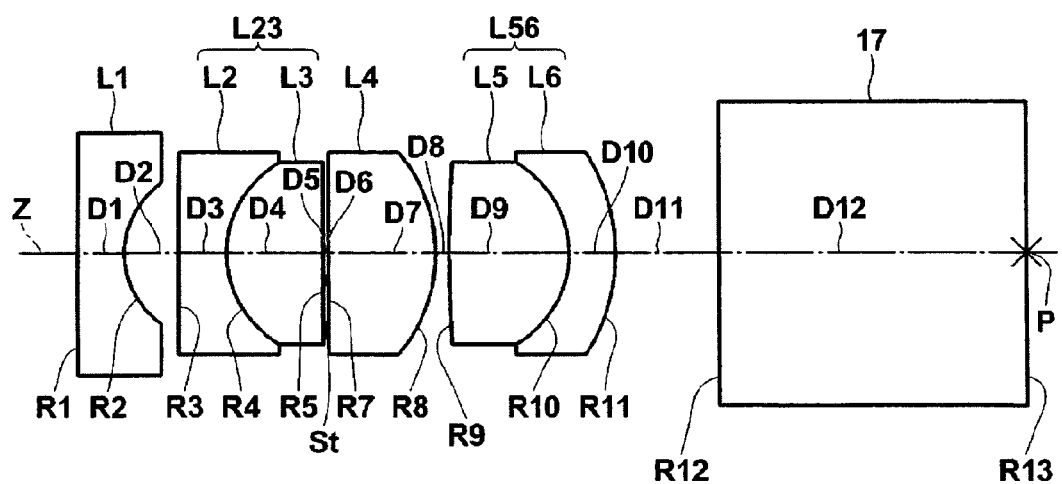
FIG. 10 is a diagram showing the lens configuration of an endoscope objective lens according to Example 6 of the invention.
Figure 11:
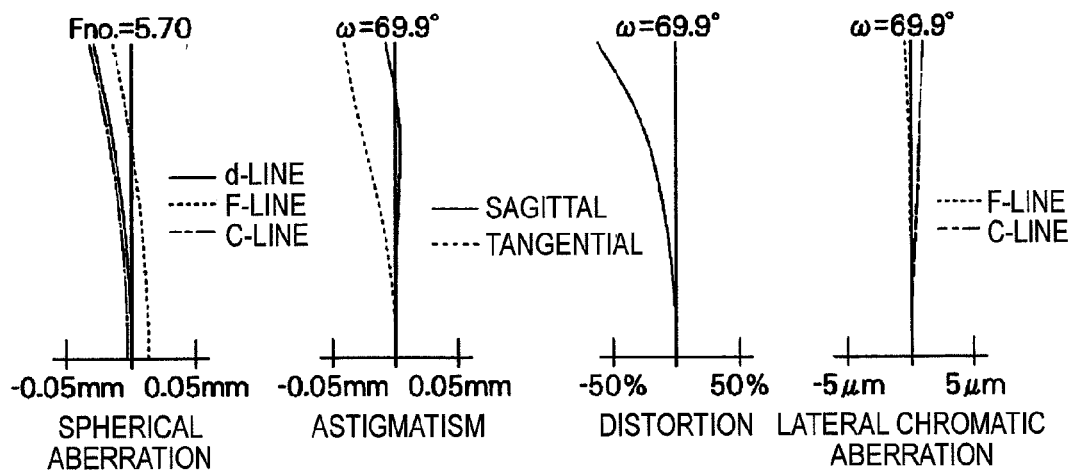
FIG. 11 show aberration diagrams of the endoscope objective lens according to Example 1 of the invention.
Figure 12:
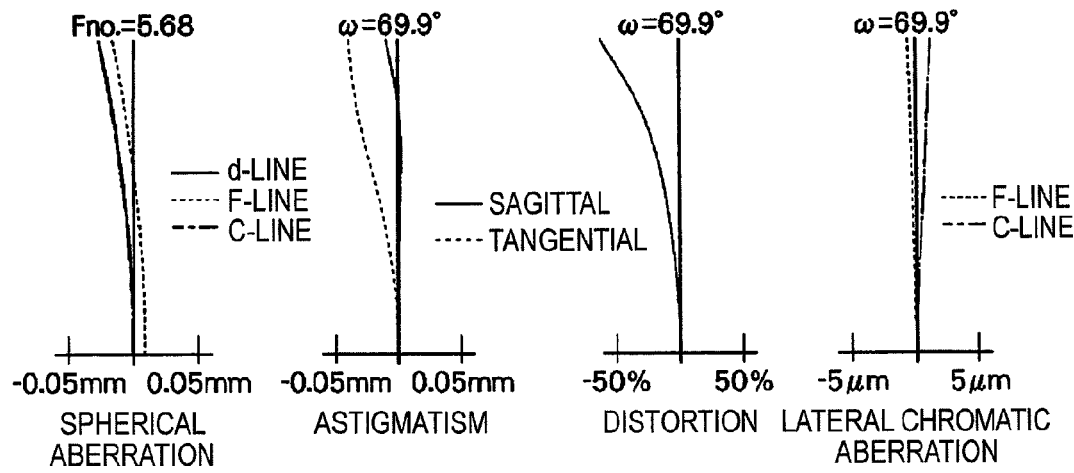
FIG. 12 shows aberration diagrams of the endoscope objective lens according to Example 2 of the invention.
Figure 13:
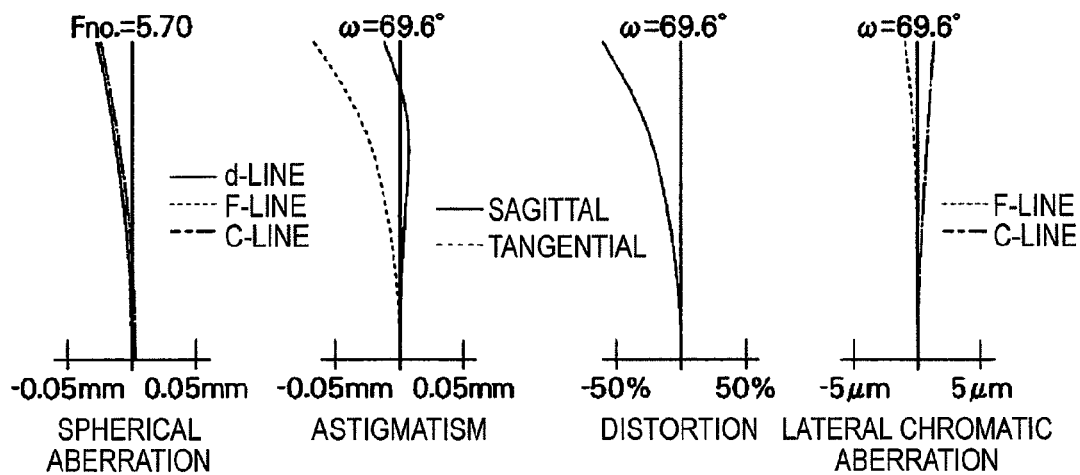
FIG. 13 shows aberration diagrams of the endoscope objective lens according to Example 3 of the invention.
Figure 14:
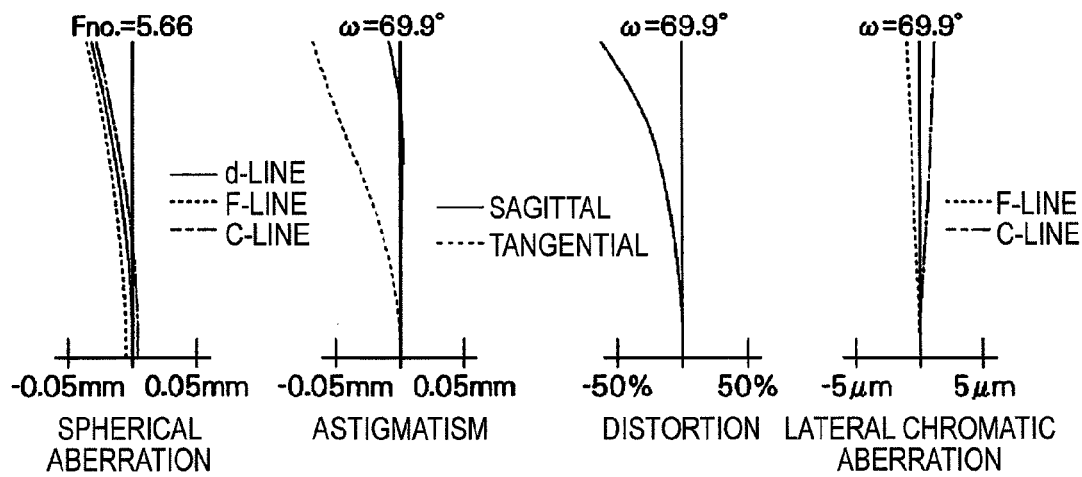
FIG. 14 shows aberration diagrams of the endoscope objective lens according to Example 4 of the invention.
Figure 15:
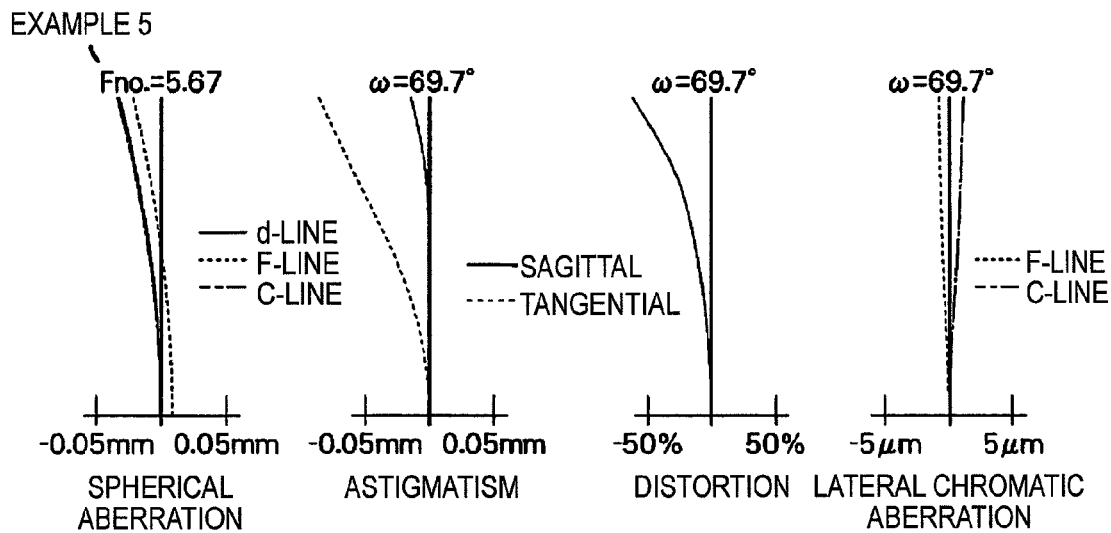
FIG. 15 shows aberration diagrams of the endoscope objective lens according to Example 5 of the invention.
Figure 16:
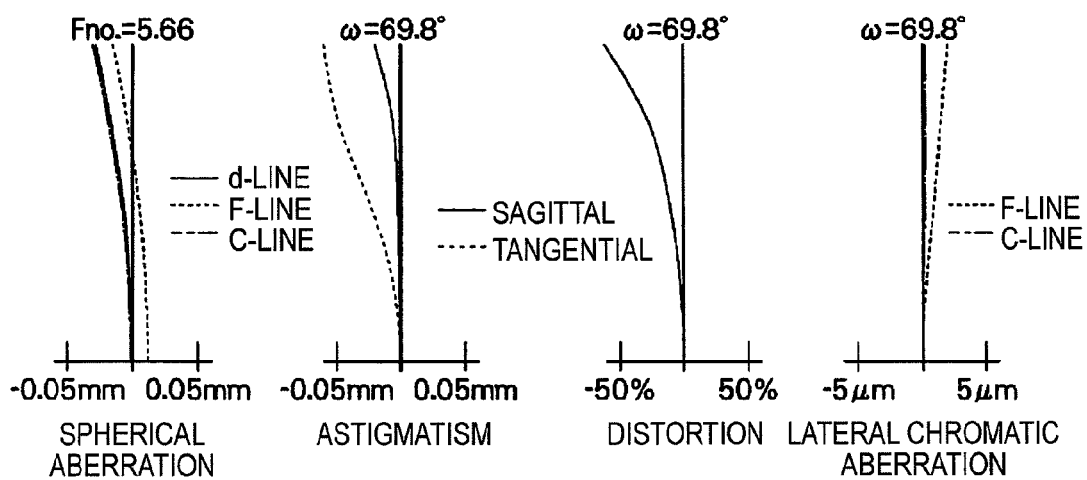
FIG. 16 shows aberration diagrams of the endoscope objective lens according to Example 6 of the invention.

The specification values of an endoscope objective lens according to Example 6 are shown in Table 6. The configuration diagram of the lens of Example 6 is shown in FIG. 10. The symbols Ri and Di shown in FIG. 10 correspond to Ri and Di shown in Table 6.

TABLE 6

EXAMPLE 6

| Surface number | Ri | Di | ndj | vdj |
|---|---|---|---|---|
| 1 | ∞ | 0.4562 | 1.88300 | 40.8 |
| 2 | 0.8714 | 0.5226 | | |
| 3 | ∞ | 0.4562 | 1.83481 | 42.7 |
| 4 | 1.0445 | 0.9423 | 1.84666 | 23.8 |
| 5 | ∞ | 0.0228 | | |
| 6 (Aperture diaphragm) | ∞ | 0.0228 | | |
| 7 | ∞ | 1.0396 | 1.62041 | 60.3 |
| 8 | −1.5585 | 0.1303 | | |
| 9 | 14.8794 | 1.1740 | 1.71300 | 53.9 |
| 10 | −1.0356 | 0.4562 | 2.14352 | 17.8 |
| 11 | −1.8359 | 1.0048 | | |
| 12 | ∞ | 3.0000 | 1.51633 | 64.1 |
| Image plane | ∞ | | | |

Aberration diagrams showing the spherical aberration, astigmatism, distortion, and lateral chromatic aberration of the endoscope objective lenses according to the above-described Examples 1 to 6 are shown in FIGS. 11 to 16. In each aberration diagram, aberration at the reference wavelength of the d-line is shown. Furthermore, in the spherical aberration diagram and the lateral chromatic aberration diagram, aberrations at the F-line (wavelength of 486.1 nm) and the C-line (wavelength of 656.3 nm) are shown. In the astigmatism diagram, a solid line denotes aberration in a sagittal direction, and a dotted line denotes aberration in a tangential direction. In the spherical aberration diagram, Fno in the vertical axis denotes an F value, and ω in the vertical axes in the other aberration diagrams denotes a half angle of view. As can be seen from FIGS. 11 to 16, in above-described Examples 1 to 6, the respective aberrations are corrected well.

Table 7 shows an object distance, a focal length f of the whole system, a back focal length (air equivalent length) Bf, a back focal length ratio Bf/f, an image height, an angle of view, the amount of distortion, and lateral chromatic aberration in each of the above-described Examples 1 to 6. The amount of the distortion and the amount of lateral chromatic aberration, which are shown in FIG. 7, are values at the maximum image height, and the amount of the chromatic aberration is a difference between the F-line and the C-line. In Table 7, although the units are not denoted, all the units are mm, unless otherwise mentioned.

TABLE 7

| | Example 1 | Example 2 | Example 3 | Example 4 | Example 5 | Example 6 | Comp. Exa,. |
|---|---|---|---|---|---|---|---|
| Object distance | 10 | 10 | 10 | 10 | 10 | 10 | 10 |
| Focal length f | 1.000 | 1.000 | 1.000 | 1.000 | 1.000 | 1.000 | 1.000 |
| Back focal length Bf | 2.520 | 2.539 | 2.617 | 3.008 | 3.003 | 2.890 | 2.418 |
| Back focal length ratio Bf/f | 2.520 | 2.539 | 2.617 | 3.008 | 3.003 | 2.890 | 2.418 |
| Image height | 1.008 | 1.002 | 1.050 | 0.992 | 0.990 | 0.998 | 0.988 |
| Angle of view (degs) | 139.7 | 139.9 | 140.4 | 139.7 | 139.5 | 139.5 | 133.0 |
| Amount of distortion (%) | −62.2 | −62.5 | −60.2 | −62.3 | −62.2 | −61.9 | 56.4 |
| Amount of lateral chromatic aberration (μm) | −1.41 | −1.80 | −2.31 | −2.19 | −1.98 | 1.54 | −2.41 |

Also, values corresponding to Conditional Expressions (1) to (5) in above-described Examples 1 to 6 are shown in Table 8. As can be seen from Table 8, Examples 1 to 6 satisfy Conditional Expressions (1) to (5).

TABLE 8

|  | Example 1 | Example 2 | Example 3 | Example 4 | Example 5 | Example 6 | Comp. Exa. |
|---|---|---|---|---|---|---|---|
| Cond. Exp. (1) | 15.5 | 14.1 | 13.7 | 12.2 | 12.3 | 11.2 | 17.1 |
| Cond. Exp. (2) | 2.520 | 2.539 | 2.617 | 3.008 | 3.003 | 2.890 | 2.418 |
| Cond. Exp. (3) | 1.28 | 1.15 | 1.34 | 1.52 | 1.38 | 1.30 | 1.29 |
| Cond. Exp. (4) | 0.99 | 1.00 | 0.95 | 1.01 | 1.01 | 1.00 | 1.01 |
| Cond. Exp. (5) | 18.9 | 23.8 | 23.8 | 18.9 | 18.9 | 18.9 | 17.1 |

Figure 17:
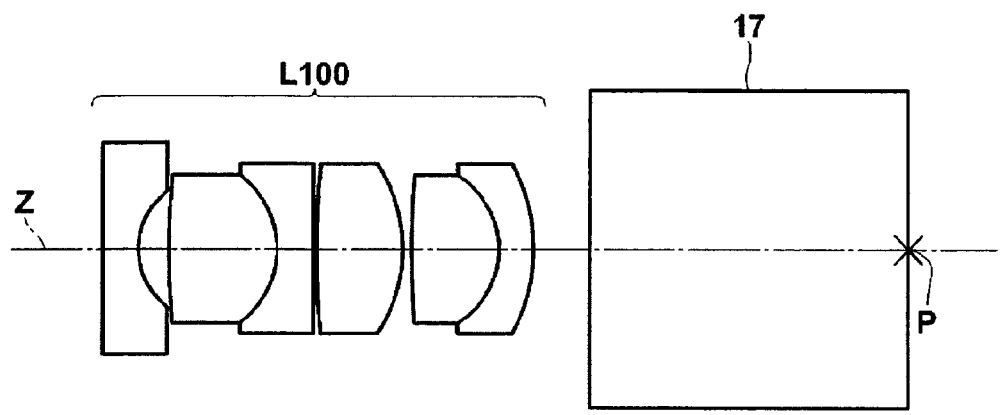
FIG. 17 is a diagram showing the lens configuration of an endoscope objective lens according to a comparative example.
Figure 18:
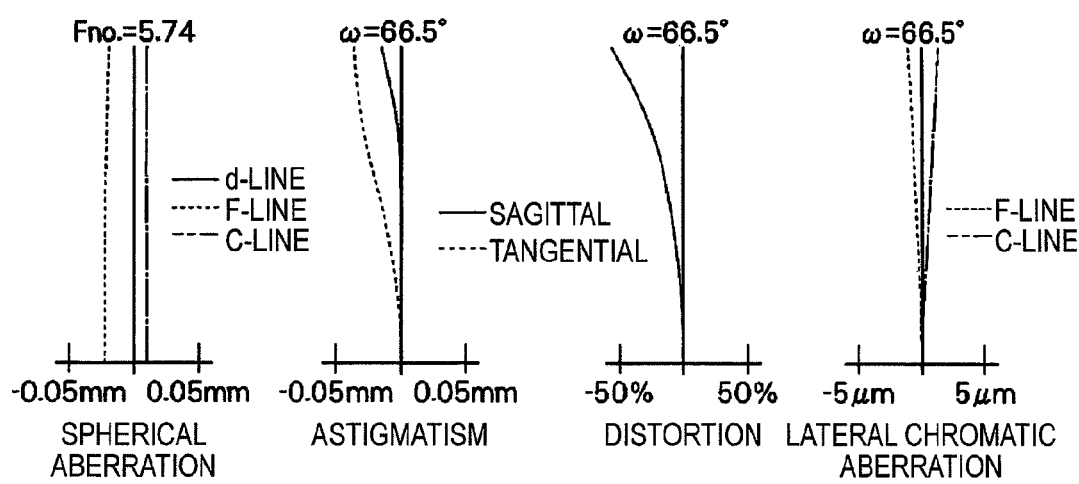
FIG. 18 shows aberration diagrams of the endoscope objective lens according to the comparative example.

Next, as Comparative Example 1, a general endoscope objective lens L100 having the same focal length as in the above-described examples will be described. The specification values of the object lens L100 are shown in Table 9. The lens configuration is shown in FIG. 17. Aberration diagrams of the object lens L100 is shown in FIG. 18. The symbols shown in FIGS. 17 and 18 have the same meanings as those in the above-described examples. Also, in Tables 7 and 8, respective values of this comparative example are shown in addition to those of the above-described examples.

TABLE 9

COMPARATIVE EXAMPLE

| Surface number | Ri | Di | ndj | vdj |
|---|---|---|---|---|
| 1 | ∞ | 0.32905 | 1.88300 | 40.8 |
| 2 | 0.6996 | 0.28827 | | |
| 3 | 8.2262 | 1.01476 | 1.84666 | 23.8 |
| 4 | −0.8813 | 0.32905 | 1.80610 | 40.9 |
| 5 | ∞ | 0.00000 | | |
| 6 (Aperture diaphragm) | ∞ | 0.02879 | | |
| 7 | 8.2262 | 0.79760 | 1.62041 | 60.3 |
| 8 | −1.4803 | 0.08226 | | |
| 9 | 7.7805 | 0.82262 | 1.62041 | 60.3 |
| 10 | −0.8226 | 0.32905 | 1.84666 | 23.8 |
| 11 | −1.6885 | 0.53487 | | |
| 12 | ∞ | 3.00000 | 1.51633 | 64.1 |
| Image plane | ∞ | | | |

As shown in FIG. 17, the objective lens L100 of this comparative example has a four-group, six-element lens configuration. In this objective lens, arranged in order from the object side are a negative lens, a cemented lens of a positive lens and a negative lens, a positive lens, and a cemented lens of a positive lens and a negative lens.

When this comparative example is compared with the above-described examples according to the invention, the four-group, six-element lens configuration is the same. However, as can be seen from the values of Conditional Expression (2) shown in Table 8, the back focal length ratio in the comparative example is smaller than 2.5, while in the examples according to the invention, the back focal length ratio is larger than 2.5 and the back focal length is sufficiently long. In addition, in the examples according to the invention, aberration including the lateral chromatic aberration is corrected well with a degree equivalent to or higher than that in the comparative example.

Example 7

Figure 20:
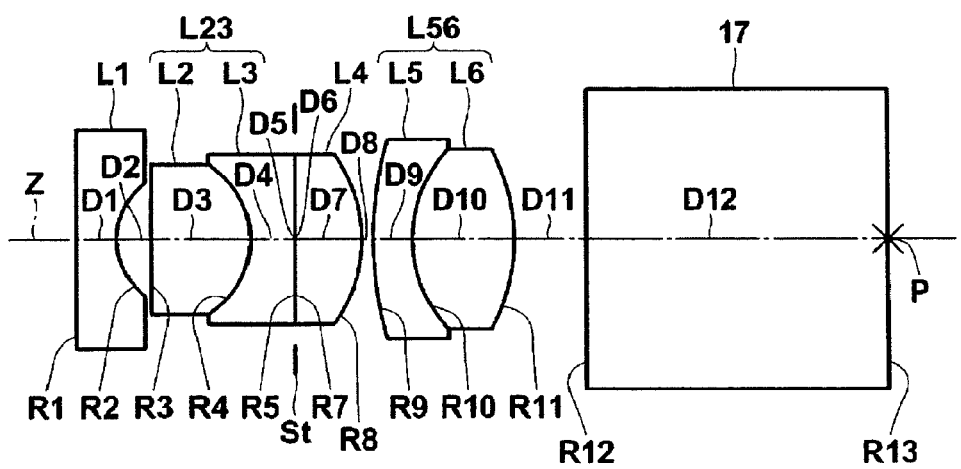
FIG. 20 is a diagram showing the lens configuration of an endoscope objective lens according to Example 7 of the invention.

The specification values of an endoscope objective lens according to Example 7 are shown in Table 10. The configuration diagram of the lens Example 7 is shown in FIG. 20. The symbols Ri and Di shown in FIG. 20 correspond to Ri and Di shown in Table 10.

TABLE 10

EXAMPLE 7

| Surface number | Ri | Di | ndj | vdj |
|---|---|---|---|---|
| 1 | ∞ | 0.3919 | 1.88300 | 40.8 |
| 2 | 0.7196 | 0.3360 | | |
| 3 | 40.8481 | 0.9598 | 1.80518 | 25.4 |
| 4 | −0.8959 | 0.4479 | 1.80400 | 46.6 |
| 5 | ∞ | 0.0000 | | |
| 6 (Aperture diaphragm) | ∞ | 0.0000 | | |
| 7 | ∞ | 0.6719 | 1.62041 | 60.3 |
| 8 | −1.4330 | 0.1120 | | |
| 9 | 3.5356 | 0.3920 | 1.92286 | 18.9 |
| 10 | 1.3164 | 1.0079 | 1.62041 | 60.3 |
| 11 | −1.9059 | 0.6990 | | |
| 12 | ∞ | 3.00000 | 1.51633 | 64.1 |
| Image plane | ∞ | | | |

Example 8

Figure 21:
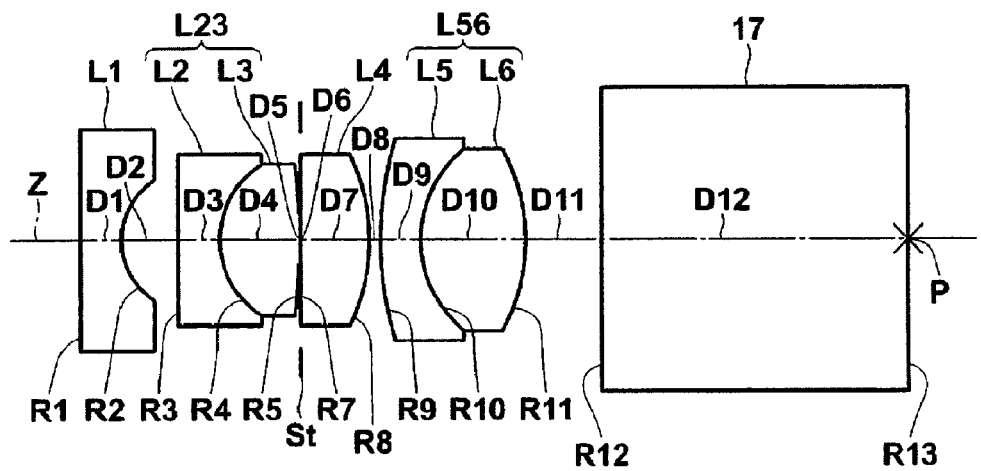
FIG. 21 is a diagram showing the lens configuration of an endoscope objective lens according to Example 8 of the invention.

The specification values of an endoscope objective lens according to Example 8 are shown in Table 11. The configuration diagram of the lens of Example 8 is shown in FIG. 21. The symbols Ri and Di shown in FIG. 21 correspond to Ri and Di shown in Table 11.

TABLE 11

EXAMPLE 8

| Surface number | Ri | Di | ndj | vdj |
|---|---|---|---|---|
| 1 | ∞ | 0.3927 | 1.88300 | 40.8 |
| 2 | 0.7147 | 0.5580 | | |
| 3 | −357.939 | 0.4005 | 1.80895 | 47.1 |
| 4 | 0.8977 | 0.7863 | 1.78217 | 25.9 |
| 5 | −5.6122 | 0.0000 | | |
| 6 (Aperture diaphragm) | ∞ | 0.0000 | | |
| 7 | ∞ | 0.6736 | 1.71300 | 53.9 |
| 8 | −2.0084 | 0.1125 | | |
| 9 | 3.5290 | 0.3929 | 1.92286 | 18.9 |
| 10 | 1.1823 | 1.0156 | 1.62041 | 60.3 |
| 11 | −1.9177 | 0.7488 | | |
| 12 | ∞ | 3.00000 | 1.51633 | 64.1 |
| Image plane | ∞ | | | |

Example 9

Figure 22:
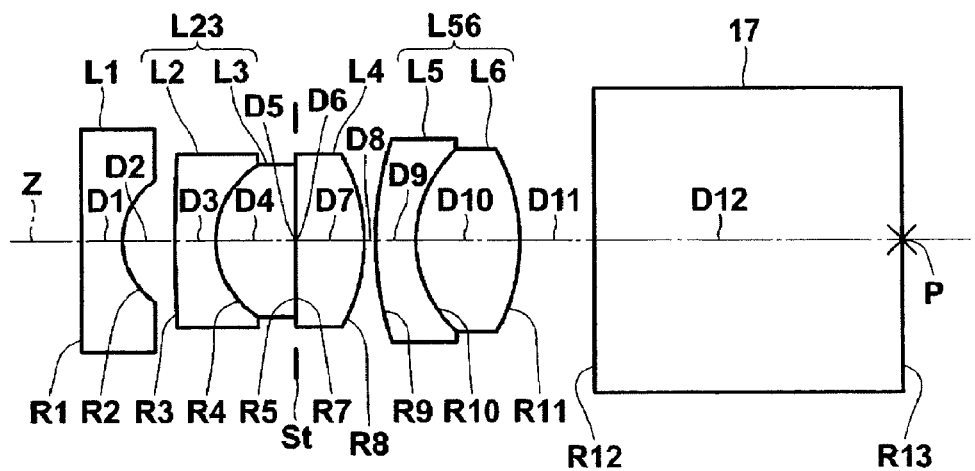
FIG. 22 is a diagram showing the lens configuration of an endoscope objective lens according to Example 9 of the invention.

The specification values of an endoscope objective lens according to Example 9 are shown in Table 12. The configuration diagram of the lens of Example 9 is shown in FIG. 22. The symbols Ri and Di shown in FIG. 22 correspond to Ri and Di shown in Table 12.

TABLE 12

EXAMPLE 9

| Surface number | Ri | Di | ndj | vdj |
|---|---|---|---|---|
| 1 | ∞ | 0.3906 | 1.88300 | 40.8 |
| 2 | 0.7163 | 0.5237 | | |
| 3 | 17.5737 | 0.3906 | 1.81000 | 47.0 |
| 4 | 0.8928 | 0.7812 | 1.80162 | 24.9 |
| 5 | ∞ | 0.0000 | | |
| 6 (Aperture diaphragm) | ∞ | 0.0000 | | |
| 7 | ∞ | 0.6696 | 1.71300 | 53.9 |
| 8 | −1.7362 | 0.1116 | | |
| 9 | 3.2937 | 0.3906 | 1.92286 | 18.9 |
| 10 | 1.2321 | 1.0044 | 1.62041 | 60.3 |
| 11 | −1.8869 | 0.7300 | | |
| 12 | ∞ | 3.00000 | 1.51633 | 64.1 |
| Image plane | ∞ | | | |

Example 10

Figure 23:
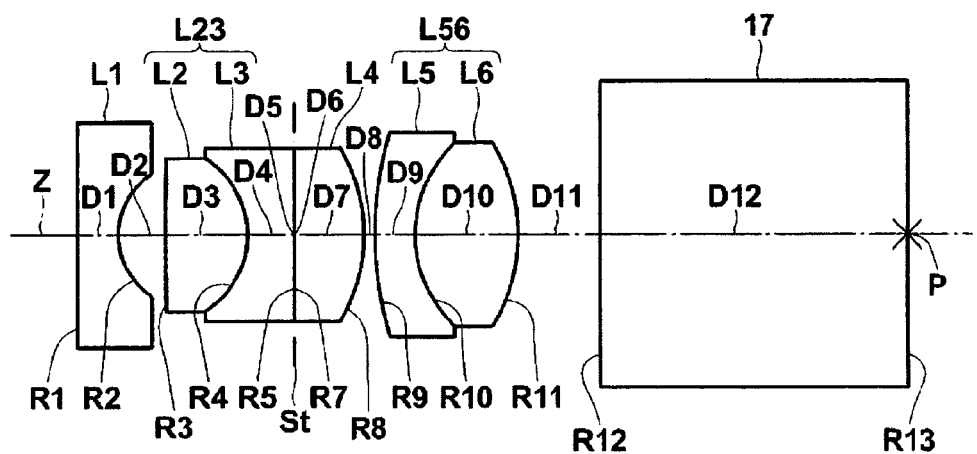
FIG. 23 is a diagram showing the lens configuration of an endoscope objective lens according to Example 10 of the invention.

The specification values of an endoscope objective lens according to Example 10 are shown in Table 13. The configuration diagram of the lens of Example 10 is shown in FIG. 23. The symbols Ri and Di shown in FIG. 23 correspond to Ri and Di shown in Table 13.

TABLE 13

EXAMPLE 10

| Surface number | Ri | Di | ndj | vdj |
|---|---|---|---|---|
| 1 | ∞ | 0.3914 | 1.88300 | 40.8 |
| 2 | 0.7229 | 0.4496 | | |
| 3 | 32.0003 | 0.7827 | 1.79423 | 25.3 |
| 4 | −0.8946 | 0.4473 | 1.80999 | 47.0 |
| 5 | ∞ | 0.0000 | | |
| 6 (Aperture diaphragm) | ∞ | 0.0000 | | |
| 7 | ∞ | 0.6709 | 1.71300 | 53.9 |
| 8 | −1.6888 | 0.1119 | | |
| 9 | 3.5760 | 0.3914 | 1.92286 | 13.9 |
| 10 | 1.2369 | 1.0064 | 1.62041 | 60.3 |
| 11 | −1.7514 | 0.7830 | | |
| 12 | ∞ | 3.00000 | 1.51633 | 64.1 |
| Image plane | ∞ | | | |

Example 11

Figure 24:
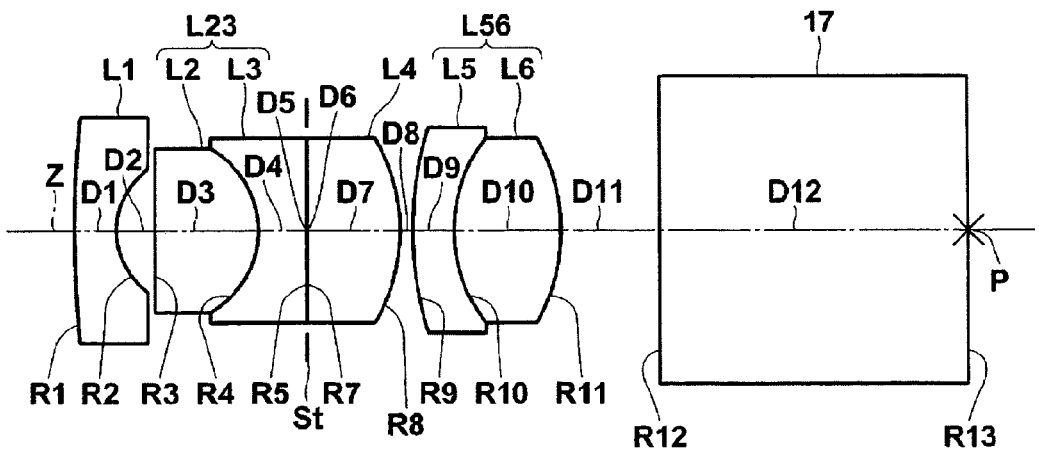
FIG. 24 is a diagram showing the lens configuration of an endoscope objective lens according to Example 11 of the invention.

The specification values of an endoscope objective lens according to Example 11 are shown in Table 14. The configuration diagram of the lens of Example 11 is shown in FIG. 24. The symbols Ri and Di shown in FIG. 24 correspond to Ri and Di shown in Table 14.

TABLE 14

EXAMPLE 11

| Surface number | Ri | Di | ndj | vdj |
|---|---|---|---|---|
| 1 | 11.5906 | 0.4057 | 2.01540 | 40.3 |
| 2 | 0.7499 | 0.3709 | | |
| 3 | 0.0000 | 0.9836 | 1.81002 | 24.5 |
| 4 | −0.9273 | 0.4636 | 1.79971 | 48.0 |
| 5 | ∞ | 0.0000 | | |
| 6 (Aperture diaphragm) | ∞ | 0.0000 | | |
| 7 | ∞ | 0.8962 | 1.71300 | 53.9 |
| 8 | −1.8117 | 0.1160 | | |
| 9 | 3.1956 | 0.4057 | 2.14352 | 17.8 |
| 10 | 1.4493 | 1.0432 | 1.62041 | 60.3 |
| 11 | −4.8567 | 0.9473 | | |

TABLE 14-continued

EXAMPLE 11

| Surface number | Ri | Di | ndj | vdj |
|---|---|---|---|---|
| 12 | ∞ | 3.00000 | 1.51633 | 64.1 |
| Image plane | ∞ | | | |

Example 12

Figure 25:
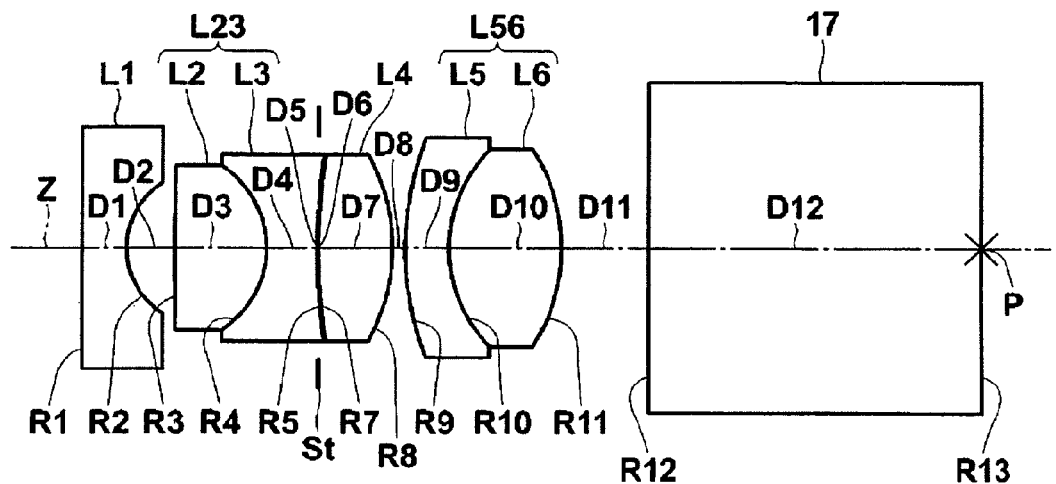
FIG. 25 is a diagram showing the lens configuration of an endoscope objective lens according to Example 12 of the invention.
Figure 26:
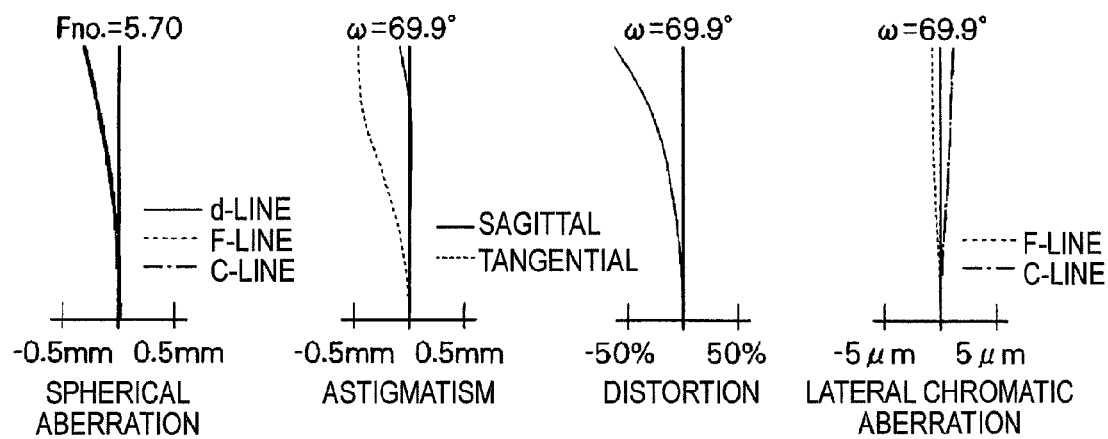
FIG. 26 shows aberration diagrams of the endoscope objective lens according to Example 7 of the invention.
Figure 27:
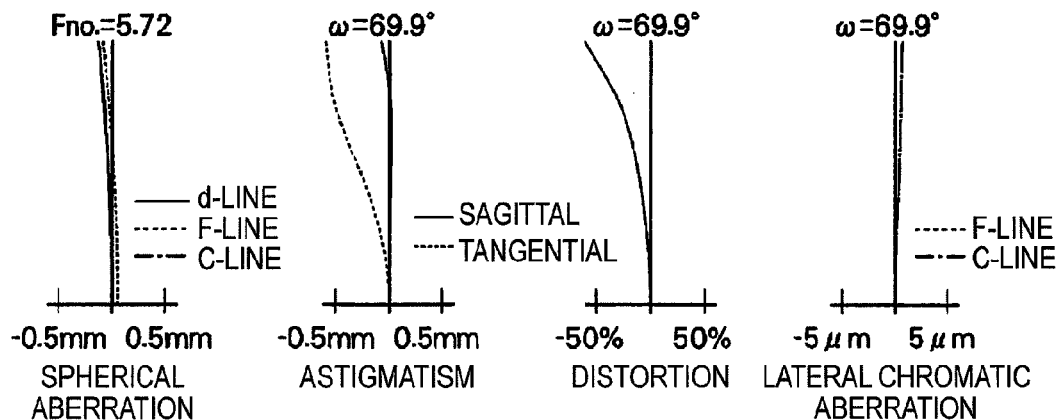
FIG. 27 shows aberration diagrams of the endoscope objective lens according to Example 8 of the invention.
Figure 28:
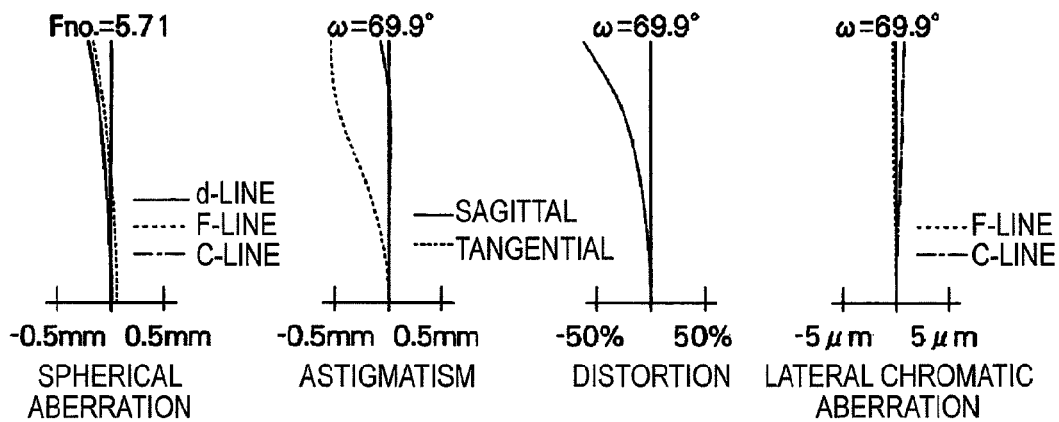
FIG. 28 shows aberration diagrams of the endoscope objective lens according to Example 9 of the invention.
Figure 29:
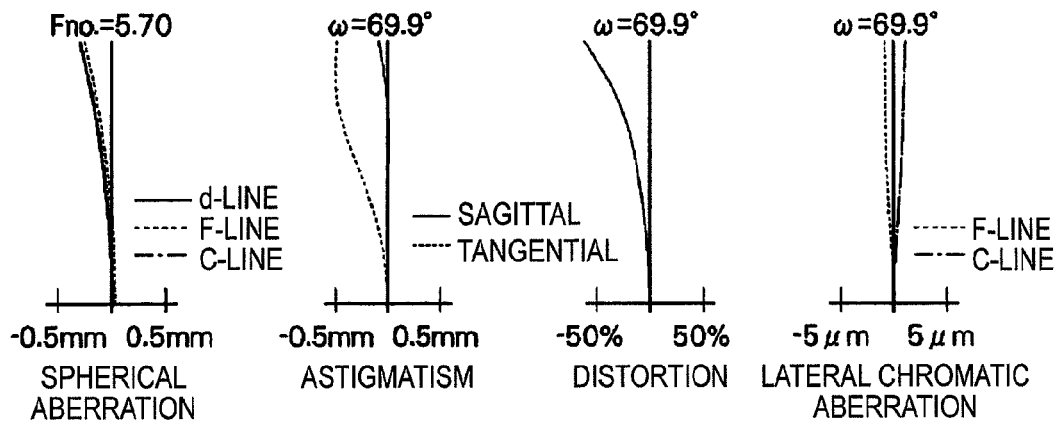
FIG. 29 shows aberration diagrams of the endoscope objective lens according to Example 10 of the invention.
Figure 30:
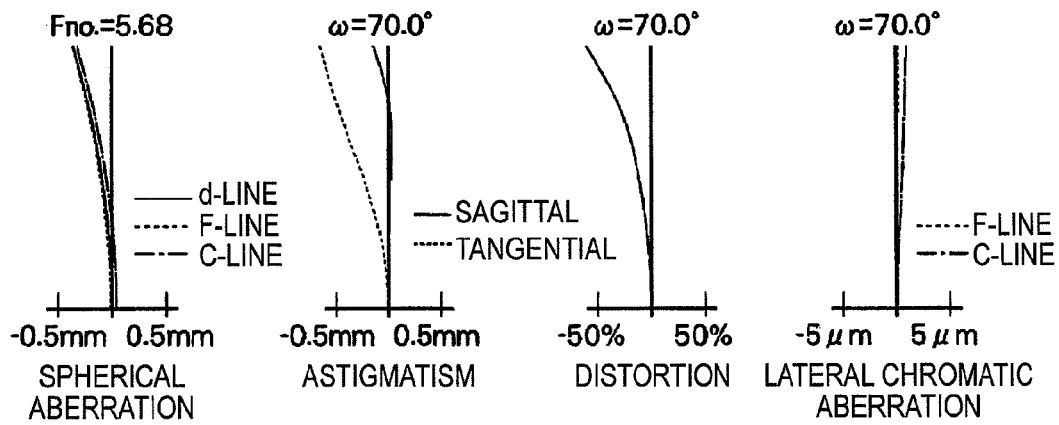
FIG. 30 shows aberration diagrams of the endoscope objective lens according to Example 11 of the invention.
Figure 31:
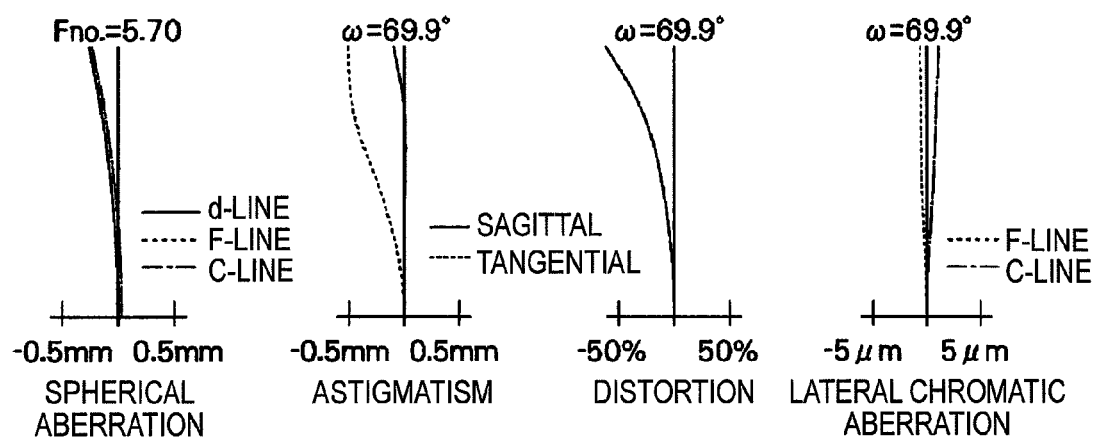
FIG. 31 shows aberration diagrams of the endoscope objective lens according to Example 12 of the invention.

The specification values of an endoscope objective lens according to Example 12 are shown in Table 12. The configuration diagram of the lens of Example 12 is shown in FIG. 25. The symbols Ri and Di shown in FIG. 25 correspond to Ri and Di shown in Table 12.

TABLE 15

EXAMPLE 12

| Surface number | Ri | Di | ndj | vdj |
|---|---|---|---|---|
| 1 | ∞ | 0.3919 | 1.88300 | 40.8 |
| 2 | 0.716 | 0.4300 | | |
| 3 | 76.5399 | 0.8149 | 1.81005 | 24.5 |
| 4 | −0.8958 | 0.4478 | 1.80973 | 47.0 |
| 5 | 5.6139 | 0.0114 | | |
| 6 (Aperture diaphragm) | ∞ | 0.0000 | | |
| 7 | 5.6317 | 0.6718 | 1.71300 | 53.9 |
| 8 | −1.7203 | 0.1120 | | |
| 9 | 2.7917 | 0.3920 | 2.14352 | 17.8 |
| 10 | 1.2877 | 1.0078 | 1.62041 | 60.3 |
| 11 | −1.7157 | 0.7985 | | |
| 12 | ∞ | 3.0000 | 1.51633 | 64.1 |
| Image plane | ∞ | | | |

Aberration diagrams showing the spherical aberration, astigmatism, distortion, and lateral chromatic aberration of the endoscope objective lenses according to above-described Examples 7 to 12 are shown in FIGS. 26 to 31. In each aberration diagram, aberration at the reference wavelength of the d-line is shown. Furthermore, in the spherical aberration diagram and the lateral chromatic aberration diagram, aberrations at the F-line (wavelength of 486.1 nm) and the C-line (wavelength of 656.3 nm) are shown. In the astigmatism diagram, a solid line denotes aberration in a sagittal direction, and a dotted line denotes aberration in a tangential direction. In the spherical aberration diagram, Fno in the vertical axis denotes an F value, and ω in the vertical axes in the other aberration diagrams denotes a half angle of view. As can be seen from FIGS. 26 to 31, in above-described Examples 7 to 12, the respective aberrations are corrected well.

Table 16 shows an object distance, a focal length f of the whole system, a back focal length (air-equivalent length) Bf, a back focal length ratio Bf/f, an image height, an angle of view, the amount of distortion, and lateral chromatic aberration in each of the above-described Examples 7 to 12. The amount of the distortion and the amount of lateral chromatic aberration which are shown in Table 16 are values at the maximum image height, and the amount of the chromatic aberration is a difference between the F-line and the C-line. In Table 16, although the unit is not denoted, all the units are mm, unless otherwise mentioned.

TABLE 16

|  | Example 1 | Example 2 | Example 3 | Example 4 | Example 5 | Example 6 | Comp. Exa,. |
|---|---|---|---|---|---|---|---|
| Object distance | 10 | 10 | 10 | 10 | 10 | 10 | 10 |
| Focal length f | 1.000 | 1.000 | 1.000 | 1.000 | 1.000 | 1.000 | 1.000 |
| Back focal length Bf | 2.582 | 2.632 | 2.613 | 2.666 | 2.831 | 2.669 | 2.418 |
| Back focal length ratio Bf/f | 2.582 | 2.632 | 2.613 | 2.666 | 2.831 | 2.669 | 2.418 |
| Image height | 1.020 | 1.018 | 1.016 | 1.018 | 1.062 | 1.020 | 0.988 |
| Angle of view (degs) | 139.8 | 139.7 | 139.8 | 139.7 | 140.0 | 139.8 | 133.0 |
| Amount of distortion (%) | −61.9 | −61.9 | −62.0 | −61.9 | −60.5 | −61.9 | 56.4 |
| Amount of lateral chromatic aberration (μm) | −1.94 | −0.76 | −1.06 | −1.97 | −0.09 | 1.78 | −2.41 |

In addition, values corresponding to Conditional Expressions (1)' and (2) to (5) in above-described Examples 7 to 12 are shown in Table 17. As can be seen from Table 17, Examples 7 to 12 satisfy Conditional Expressions (1)' and (2) to (5).

TABLE 17

|  | Example 1 | Example 2 | Example 3 | Example 4 | Example 5 | Example 6 | Comp. Exa. |
|---|---|---|---|---|---|---|---|
| Cond. Exp. (1) | 9.8 | 10.7 | 10.4 | 10.2 | 8.4 | 10.0 | 17.1 |
| Cond. Exp. (2) | 2.582 | 2.632 | 2.613 | 2.666 | 2.831 | 2.669 | 2.418 |
| Cond. Exp. (3) | 1.37 | 1.51 | 1.44 | 1.38 | 1.46 | 1.41 | 1.29 |
| Cond. Exp. (4) | 0.98 | 0.98 | 0.98 | 0.98 | 0.94 | 0.98 | 1.01 |
| Cond. Exp. (5) | 21.2 | 21.2 | 22.1 | 21.7 | 23.5 | 22.5 | 17.1 |

The configuration and the specification values of the comparative example are described above, and a description thereon will be omitted here.

Although embodiments and examples of the invention have been described as above, the invention is not limited to the above-described embodiments and examples. Various modifications can be made thereto. For example, the radius of curvature, a surface separation, and a refraction index of the respective element lenses are not limited to the values shown in the above-described examples, and may have other values.

What is claimed is:

1. An endoscope objective lens comprising, in order from an object side:
   a negative first lens having a concave surface directed to an image side;
   a first cemented lens formed by cementing a second lens and a third lens, one of the second and third lenses being positive and, the other being negative;
   a stop;
   a positive fourth lens including a flat surface or a surface having a larger absolute value in radius of curvature, directed to the object side; and
   a second cemented lens formed by cementing a positive fifth lens and a negative sixth lens in order from the object side, the second cemented lens having a positive refractive power as a whole, wherein
   the endoscope objective lens satisfies the following conditional expressions (1) and (2)

$$\frac{f^2 \times |\nu_5 - \nu_6|}{|R_A| \times (Bf + d_6/n_6)} > 10 \quad (1)$$

$$Bf/f > 2.5 \quad (2)$$

$$\nu_6 < 20 \quad (6)$$

where f denotes a focal length of the entire system,
Bf denotes an air-equivalent length of a back focal length of the entire system,
$\nu_5$ denotes an Abbe number of the fifth lens,
$\nu_6$ denotes an Abbe number of the sixth lens,
$R_A$ denotes a radius of curvature of a cemented surface between the fifth and sixth lenses,
$d_6$ is a center thickness of the sixth lens, and
$n_6$ is an index of refraction of the sixth lens.

2. The endoscope objective lens according to claim 1, wherein the endoscope objective lens satisfies the following conditional expression (3):

$$1.00 < |d/f_1| < 2.00 \quad (3)$$

where d denotes an air-equivalent distance, on an optical axis, from an apex of the concave surface of the first lens on the image side to the stop, and
$f_1$ denotes a focal length of the first lens.

3. The endoscope objective lens according to claim 1, wherein the endoscope objective lens satisfies the following conditional expression (4):

$$0.95 < f/h < 1.05 \quad (4)$$

where h denotes a maximum image height.

4. The endoscope objective lens according to claim 2, wherein the endoscope objective lens satisfies the following conditional expression (4):

$$0.95 < f/h < 1.05 \quad (4)$$

where h denotes a maximum image height.

5. The endoscope objective lens according to claim 1, wherein the endoscope objective lens satisfies the following conditional expression (5):

$$15.0 < |\nu_2 - \nu_3| \quad (5)$$

where $\nu_2$ is an Abbe number of the second lens, and $\nu_3$ is an Abbe number of the third lens.

6. The endoscope objective lens according to claim 3, wherein the endoscope objective lens satisfies the following conditional expression (5):

$$15.0 < |\nu_2 - \nu_3| \quad (5)$$

where $v_2$ is an Abbe number of the second lens, and $v_3$ is an Abbe number of the third lens.

7. The endoscope objective lens according to claim 4, wherein the endoscope objective lens satisfies the following conditional expression (5):

$$15.0 < |v_2 - v_3| \qquad (5)$$

where $v_2$ is an Abbe number of the second lens, and $v_3$ is an Abbe number of the third lens.

8. An endoscope comprising the endoscope objective lens according to claim 1.

9. An endoscope comprising the endoscope objective lens according to claim 7.

10. An endoscope objective lens comprising, in order from an object side:
 a negative first lens having a concave surface directed to an image side;
 a first cemented lens formed by cementing a second lens and a third lens, one of the second and third lenses being positive and, the other being negative;
 a stop;
 a positive fourth lens including a flat surface or a surface having a larger absolute value in radius of curvature, directed to the object side; and
 a second cemented lens formed by cementing a negative fifth lens and a positive sixth lens in order from the object side, the second cemented lens having a positive refractive power as a whole, wherein
the endoscope objective lens satisfies the following conditional expressions (1)' and (2)

$$\frac{f^2 \times |v_5 - v_6|}{|R_A| \times (Bf + d_6/n_6)} > 8 \qquad (1)'$$

$$Bf/f > 2.5 \qquad (2)$$

where f denotes a focal length of the entire system,
 Bf denotes an air-equivalent length of a back focal length of the entire system,
 $v_5$ denotes an Abbe number of the fifth lens,
 $v_6$ denotes an Abbe number of the sixth lens,
 $R_A$ denotes a radius of curvature of a cemented surface between the fifth and sixth lenses,
 $d_6$ is a center thickness of the sixth lens, and
 $n_6$ is an index of refraction of the sixth lens.

11. The endoscope objective lens according to claim 10, wherein the endoscope objective lens satisfies the following conditional expression (3):

$$1.00 < |d/f_1| < 2.00 \qquad (3)$$

where d denotes an air-equivalent distance, on an optical axis, from an apex of the concave surface of the first lens on the image side to the stop, and
 $f_1$ denotes a focal length of the first lens.

12. The endoscope objective lens according to claim 10, wherein the endoscope objective lens satisfies the following conditional expression (4):

$$0.95 < f/h < 1.05 \qquad (4)$$

where h denotes a maximum image height.

13. The endoscope objective lens according to claim 11, wherein the endoscope objective lens satisfies the following conditional expression (4):

$$0.95 < f/h < 1.05 \qquad (4)$$

where h denotes a maximum image height.

14. The endoscope objective lens according to claim 10, wherein the endoscope objective lens satisfies the following conditional expression (5):

$$15.0 < |v_2 - v_3| \qquad (5)$$

where $v_2$ is an Abbe number of the second lens, and $v_3$ is an Abbe number of the third lens.

15. The endoscope objective lens according to claim 12, wherein the endoscope objective lens satisfies the following conditional expression (5):

$$15.0 < |v_2 - v_3| \qquad (5)$$

where $v_2$ is an Abbe number of the second lens, and $v_3$ is an Abbe number of the third lens.

16. The endoscope objective lens according to claim 13, wherein the endoscope objective lens satisfies the following conditional expression (5):

$$15.0 < |v_2 - v_3| \qquad (5)$$

where $v_2$ is an Abbe number of the second lens, and $v_3$ is an Abbe number of the third lens.

17. An endoscope comprising the endoscope objective lens according to claim 10.

18. An endoscope comprising the endoscope objective lens according to claim 16.

19. The endoscope objective lens according to claim 10, wherein the endoscope objective lens satisfies the following conditional expression (6'):

$$v_5 < 20 \qquad (6').$$

* * * * *